United States Patent
Haverinen et al.

(10) Patent No.: US 9,516,678 B2
(45) Date of Patent: *Dec. 6, 2016

(54) SUPPORTING AN ACCESS TO A DESTINATION NETWORK VIA A WIRELESS ACCESS NETWORK

(75) Inventors: Henry Haverinen, Tampere (FI); Fabien Rapin, Helsinki (FI); Mikko Siikaniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 766 days.

This patent is subject to a terminal disclaimer.

(21) Appl. No.: 13/352,649

(22) Filed: Jan. 18, 2012

(65) Prior Publication Data

US 2012/0113813 A1    May 10, 2012

Related U.S. Application Data

(63) Continuation of application No. 12/224,453, filed as application No. PCT/IB2006/050651 on Mar. 2, 2006, now Pat. No. 8,199,657.

(51) Int. Cl.
  *G01R 31/08* (2006.01)
  *H04W 76/02* (2009.01)
  (Continued)

(52) U.S. Cl.
  CPC .......... *H04W 76/02* (2013.01); *H04L 12/2697* (2013.01); *H04L 12/2856* (2013.01); *H04L 43/0811* (2013.01); *H04L 43/50* (2013.01); *H04L 63/101* (2013.01); *H04W 12/08* (2013.01);
  (Continued)

(58) Field of Classification Search
  CPC ....................................................... H04W 4/00

USPC ................. 370/252–254, 389–427, 466–473
See application file for complete search history.

(56) References Cited

U.S. PATENT DOCUMENTS 5,889,955 A    3/1999  Shinozaki et al.
6,662,217 B1   12/2003 Godfrey et al.
(Continued)

FOREIGN PATENT DOCUMENTS

CA         2552401        8/2005
CN       CN1426555 A      6/2003
(Continued)

OTHER PUBLICATIONS

J. Arkko, et al; "Newtork Discovery and Selection Problem;" IETF Standard-Working-Draft; Internet Engineering Task Force, IETF, CH, vol. eap; No. 3; Oct. 23, 2005; ISN: 0000-0004; Abstract; Chapter 1—Introduction (p. 3); Chapter 2.2—Identity selection (pp. 6-7); and Chapter 2.6—Type of Information (pp. 13-14).
(Continued)

*Primary Examiner* — Iqbal Zaidi
(74) *Attorney, Agent, or Firm* — Locke Lord LLP

(57) ABSTRACT

For supporting an access to a destination network by a mobile device via a wireless access network, the mobile device generates a predetermined request, which is addressed to a connectivity test server in the destination network. The predetermined request is transmitted to the wireless access network. In case the predetermined request reaches the connectivity test server, it generates a predetermined response and transmits it to the mobile device via the wireless access network. The mobile device determines whether a response to the predetermined request is received from the wireless access network and whether a received response corresponds to the predetermined response.

146 Claims, 11 Drawing Sheets

(51) Int. Cl.
*H04W 48/08* (2009.01)
*H04L 12/26* (2006.01)
*H04L 12/28* (2006.01)
*H04W 12/08* (2009.01)
*H04W 24/06* (2009.01)
*H04W 84/12* (2009.01)
*H04L 29/06* (2006.01)
*H04L 29/08* (2006.01)
*H04W 12/06* (2009.01)
*H04W 80/04* (2009.01)

(52) U.S. Cl.
CPC ............ *H04W 24/06* (2013.01); *H04W 48/08* (2013.01); *H04L 29/0602* (2013.01); *H04L 29/08846* (2013.01); *H04L 63/08* (2013.01); *H04L 67/28* (2013.01); *H04W 12/06* (2013.01); *H04W 80/04* (2013.01); *H04W 84/12* (2013.01)

(56) References Cited

U.S. PATENT DOCUMENTS

| | | | |
|---|---|---|---|
| 6,918,041 | B1 | 7/2005 | Chen |
| 7,200,362 | B2 | 4/2007 | Muratsu |
| 7,367,051 | B1 | 4/2008 | Siegrist et al. |
| 7,369,537 | B1 | 5/2008 | Kirchhoff et al. |
| 7,415,536 | B2 * | 8/2008 | Nakazawa ............ 709/245 |
| 7,610,014 | B2 | 10/2009 | Buckley |
| 7,848,737 | B2 | 12/2010 | Ramos Robles et al. |
| 8,341,700 | B2 | 12/2012 | Malinen et al. |
| 8,364,148 | B2 | 1/2013 | Dravida et al. |
| 8,559,925 | B2 | 10/2013 | Zhang |
| 8,631,163 | B1 | 1/2014 | Huang et al. |
| 2003/0161265 | A1 | 8/2003 | Cao et al. |
| 2003/0231206 | A1 | 12/2003 | Armstrong |
| 2004/0068653 | A1 | 4/2004 | Fascenda |
| 2004/0143579 | A1 | 7/2004 | Nakazawa |
| 2004/0162874 | A1 | 8/2004 | Woo et al. |
| 2004/0181692 | A1 | 9/2004 | Wild et al. |
| 2005/0091357 | A1 | 4/2005 | Krantz et al. |
| 2005/0105543 | A1 | 5/2005 | Ikenaga et al. |
| 2005/0180439 | A1 | 8/2005 | Kondo et al. |
| 2005/0268122 | A1 | 12/2005 | Young et al. |
| 2006/0030354 | A1 | 2/2006 | Ho et al. |
| 2006/0160537 | A1 | 7/2006 | Buckley et al. |
| 2006/0172737 | A1 | 8/2006 | Hind et al. |
| 2006/0230139 | A1 | 10/2006 | Locke |
| 2007/0038726 | A1 | 2/2007 | Vaidya et al. |
| 2007/0083470 | A1 | 4/2007 | Bonner et al. |
| 2007/0083788 | A1 | 4/2007 | Johnson et al. |
| 2007/0123223 | A1 | 5/2007 | Letourneau et al. |
| 2007/0177524 | A1 | 8/2007 | Qian et al. |
| 2009/0073886 | A1 | 3/2009 | Burns et al. |
| 2009/0279506 | A1 | 11/2009 | Sinnreich et al. |

FOREIGN PATENT DOCUMENTS

| | | |
|---|---|---|
| CN | 1567895 A | 1/2005 |
| CN | CN1630233 A | 6/2005 |
| CN | CN1703925 A | 11/2005 |
| EP | 1370050 | 12/2003 |
| EP | 1494395 | 1/2005 |
| EP | 1589781 | 10/2005 |
| EP | 1713207 | 10/2006 |
| EP | 1989827 | 11/2008 |
| JP | 2004120547 A | 4/2004 |
| JP | 2004-328230 | 11/2004 |
| JP | 2005252613 A | 9/2005 |
| JP | 2005267122 A | 9/2005 |
| JP | 2005341237 A | 12/2005 |
| WO | WO0219636 | 3/2002 |
| WO | WO2004008693 | 1/2004 |
| WO | 2004031488 | 4/2004 |
| WO | WO2004056068 | 7/2004 |
| WO | WO2005009064 | 1/2005 |
| WO | WO2005039112 | 4/2005 |
| WO | 2005053220 | 6/2005 |
| WO | WO2005053220 * | 6/2005 |
| WO | WO 2005053220 A1 * | 6/2005 |
| WO | WO2005094106 | 10/2005 |
| WO | WO2006020975 | 2/2006 |
| WO | WO2007010319 | 1/2007 |
| WO | WO2007068992 | 6/2007 |

OTHER PUBLICATIONS

J. Rosenberg, et al; "STUN—Simple Traversal of User Datagram Protocol (UDP) Through Network Address Translation (NATs);" Network Working Group; Standards Track; Mar. 2003; whole document.
"Nokia 9300i Using WLAN", Nokia Corporation, Issue 1, 2005, 15 pages.
"Nokia 9500 Communicator Using WLAN", Nokia Corporation, Issue 1, 2005 15 pages.
"3rd Generation Partnership Project; Technical Specification Group Services and System Aspects; 3GPP system to Wireless Local Area Network (WLAN) interworking; System description (Release 7)", 3GPP TS 23.234, V 7.1.0, Mar. 2006, 81 pages.
Anton, B. et al., "Best Current Practices for Wireless Internet Service Provider (WISP) Roaming", Wi-Fi Alliance, Wireless ISP Roaming, Version 1.0, Feb. 2003, 37 pages.
"CRs on 23.234 (3GPP WLAN interworking)", TSG SA WG2, Technical Specification Group Services and System Aspects Meeting #25, Palm Springs, USA, 2004, 90 pages.
English Language Machine Translation of Chinese Patent Application Publication No. CN1426555A, 5 pages.
English Language Machine Translation of Chinese Patent Application Publication No. CN1630233A, 6 pages.
English Language Machine Translation of Chinese Patent Application Publication No. 1703925A, 9 pages.
English Language Machine Translation of Chinese Patent Application Publication No. CN1567895A, 7 pages.
Dai Zovi, Dino A., et al., "Attacking Automatic Wireless Network Selection", Proceedings of the 2005 IEEE Workshop on Information Assurance and Security, US Military Academy, West Point, NY, pp. 365-372.
Lee, Yui-Wah et al., "Network Selection and Discovery of Service Information in Public WLAN Hotspots", Bell Laboratories, WMASH '04, Oct. 1, 2004, Philadelphia, Pennsylvania, pp. 81-92.

* cited by examiner

SUPPORTING AN ACCESS TO A DESTINATION NETWORK VIA A WIRELESS ACCESS NETWORK

CROSS REFERENCE TO RELATED APPLICATION

This application is a continuation of co-pending application Ser. No. 12/224,453 filed on Aug. 26, 2008 and is claiming domestic priority under all applicable sections of 35 U.S.C. §120, which in turn is a U.S. National Stage of International Application Number PCT/IB2006/050651 filed on Mar. 2, 2006 which was published in English on Sep. 7, 2007 under International Publication Number WO 2007/099414.

FIELD OF THE INVENTION

The invention relates to methods of supporting an access to a destination network by a mobile device via a wireless access network. The invention relates equally to a corresponding mobile device, to a corresponding connectivity test server, to a corresponding system, to corresponding software codes and to corresponding software program products.

BACKGROUND OF THE INVENTION

A wireless access network, like a wireless local access network (WLAN), may be accessed by a mobile device for making use of services provided by the wireless access network. Some wireless access networks may provide an unlimited access. Other wireless access networks may request an authentication of a mobile device before enabling an access, for instance in order to be able to charge for a provided service. Still other wireless access networks may provide an access only to mobile devices of a selected group. A service that may be provided by a wireless access network, among others, is a connection to the Internet or to some other network.

Some mobile devices comprise a "search for WLAN" functionality, which allows a user to connect to any available WLAN without having a preconfigured profile. In mobile terminals Nokia 9500 and 9300i, for instance, this functionality is called Easy WLAN. Some devices might also implement this functionality implicitly and join to previously unknown networks automatically, if none of the pre-configured networks are available.

When a user selects the "Search for WLAN" functionality or when such functionality is used automatically, and the mobile device discovers a WLAN which is not known to the mobile device so far, however, the mobile device may still lack important information.

For instance, the mobile device does not know the connectivity that is provided by the new connection. A user may desire to connect to the global Internet making use of the WLAN, but the WLAN might provide, for instance, only a limited Internet access or only an access to an enterprise intranet.

Further, in many public WLANs, the user has to perform a browser authentication in order to get access to the network. This is sometimes referred to as the Universal Access Method (UAM). The user may enter some Uniform Resource Locator (URL), and a browser sends a Hypertext Transfer Protocol (HTTP) requests to the WLAN. An access controller of the WLAN intercepts, or hi-jacks, the HTTP session and presents a login page to the user. The user logs on by filling in the fields on the login page.

When such a browser authentication is used, the mobile device does not know when the user has successfully completed the browser authentication. As a result, the middleware of the mobile device is not able to indicate the availability of the new connection to the application, to a Mobile Internet Protocol (IP) client or to a virtual private network (VPN) client requesting the access at the correct time. If the new connection is indicated to be available before the authentication phase has been completed, then the connectivity of the application, the mobile IP or the VPN client will be unnecessarily meddled, possibly leading to a connection failure.

Further, after joining a new WLAN, the mobile device does not know yet whether or not browser authentication is required. This makes it difficult to decide whether to save the connection for future use. It might not be desirable to save the connection for future use, if the authentication information is missing.

Further, when the user is using the browser, the mobile device does not know whether the user is just generally browsing or performing browser authentication to a WLAN. Therefore, the mobile device is not able to help the user with the browser authentication, for example by "recording" the browser authentication as a script and playing it back on the next connection.

Mobile devices that support several network access technologies may moreover use different connection methods to connect to a destination or target network, like the public Internet, a private network such as an enterprise intranet or an operator service network. A mobile device may reach the Internet, for instance, via a WCDMA network or via some WLAN. When establishing a connection to a particular destination network, the mobile device could automatically select the best available connection method. Once a connection to the destination network has been established, the mobile device could further roam automatically between the connection methods to ensure that always the best available connection method is used. Such a roaming can be performed on an application-level or on a network-level. For an application-level roaming, the mobile device does not require support from the network. A network-level roaming, in contrast, requires some network support.

Usually, it only makes sense to roam automatically between connections that connect to the same destination network, like the Internet. When discovering a WLAN, which is unknown to the mobile device, with the "Search for WLAN" functionality, the mobile device does not know the connectivity provided by the new connection. Therefore, the connection cannot easily be used for roaming. The roaming decision is also rendered difficult, since the mobile device does not know whether browser authentication is required when joining a new WLAN.

SUMMARY OF THE INVENTION

The invention provides a mobile device with information about a current level of connectivity when trying to access a destination network via a wireless access network.

A first method of supporting an access to a destination network by a mobile device via a wireless access network is proposed. The method comprises at the mobile device generating at least one predetermined request, which predetermined request is addressed to a connectivity test server in the destination network, and transmitting the at least one predetermined request to the wireless access network. The method further comprises at the mobile device determining whether a response to the at least one predetermined request is received from the wireless access network and whether a received response corresponds to a predetermined response which is known to be provided by the connectivity test server in case the connectivity test server is reached by the at least one predetermined request.

Moreover, a second method of supporting an access to a destination network by a mobile device via a wireless access network is proposed. The method comprises at a connectivity test server in the destination network receiving at least one predetermined request from a mobile device via the wireless access network. The at least one predetermined request is defined specifically for enabling a mobile device to test whether a connection to the destination network has been established. The method further comprises at the connectivity test server generating a predetermined response to the at least one received predetermined request and transmitting the predetermined response to the mobile device via the wireless access network.

Moreover, a mobile device supporting an access to a destination network via a wireless access network is proposed. The mobile device comprises processing means adapted to generate at least one predetermined request, which predetermined request is addressed to a connectivity test server in the destination network, and to provide the at least one predetermined request for transmission to the wireless access network. The mobile device further comprises processing means adapted to determine whether a response to a transmitted at least one predetermined request is received from the wireless access network and whether a received response corresponds to a predetermined response which is known to be provided by the connectivity test server in case the connectivity test server is reached by the at least one predetermined request.

The processing means can be realized in hardware and/or in software. The may comprise for instance corresponding software code and a processor executing this software code. Alternatively, they could be realized for instance by a circuit which is integrated in a chip.

Moreover, a connectivity test server supporting an access to a destination network by a mobile device via a wireless access network is proposed. The connectivity test server comprises processing means adapted to receive at least one predetermined request from a mobile device via the wireless access network. The at least one predetermined request is defined specifically for enabling a mobile device to test whether a connection to the destination network has been established. The connectivity test server further comprises processing means adapted to generate a predetermined response to at least one received predetermined request and to provide the predetermined response for transmission to the mobile device via the wireless access network.

The processing means can be realized again in hardware and/or in software. The may comprise for instance corresponding software code and a processor executing this software code. Alternatively, they could be realized for instance by a circuit which is integrated in a chip.

Moreover, a communication system is proposed, which comprises the proposed mobile device and the proposed connectivity test server.

Moreover, a first software code for supporting an access to a destination network by a mobile device via a wireless access network is proposed. When being executed in a processor of the mobile device, the software code generates at least one predetermined request, which predetermined request is addressed to a connectivity test server in the destination network, and provides the at least one predetermined request for transmission to the wireless access network. Further, it determines whether a response to the at least one predetermined request is received from the wireless access network and whether a received response corresponds to a predetermined response which is known to be provided by the connectivity test server in case the connectivity test server is reached by the at least one predetermined request.

Moreover, a second software code for supporting an access to a destination network by a mobile device via a wireless access network is proposed. When being executed in a processor of a connectivity test server in the destination network, the software code receives at least one predetermined request from a mobile device via the wireless access network. The at least one predetermined request is defined specifically for enabling a mobile device to test whether a connection to the destination network has been established. Further, the software code generates a predetermined response to the at least one received predetermined request and provides the predetermined response for transmission to the mobile device via the wireless access network.

Finally, a readable medium is proposed, in which the first or the second proposed software code is stored. The readable medium can be for instance a separate memory device, a memory for implementation in a mobile device or a connectivity test server, respectively, that can be accessed by a processor for executing the stored software code, or a more comprehensive module for implementation in a mobile device or a connectivity test server, respectively, etc.

The invention proceeds from the idea that a mobile device desiring to access a destination network via a wireless access network could first 'ping' a test service in the destination network, which would respond with a well-known response. The destination network can be in particular, though not exclusively, the Internet.

It is an advantage of the invention that it provides fast information to a mobile device on whether there is a connection to the destination network via the wireless access network or whether the wireless access network blocks the access to the destination network, either temporarily or permanently.

Obtaining such information is of particular advantage to a mobile device, in case the wireless access network is unknown so far to the mobile device, for instance if the wireless access network had been selected by a user with a "search wireless access network" functionality offered by the mobile device.

The reception of a predetermined response to the at least one predetermined request may be considered to indicate a connection to the destination network.

If the access to the destination network has been requested by an application or a mobile IP or VPN client of the mobile device, this application or client may then be informed about the connection to the destination network. Thus, the application or client can be informed as soon as possible, but at the same time not too early about the connection. The latter ensures that it can be avoided that the application or client suffers from connection failures.

A connection to the destination network via the wireless access network may also be saved for further use. Preferably, a user is first asked whether the connection is to be saved or not. If the destination network is the Internet, a connection may be saved for instance by creating an Internet Access Point (IAP).

The connection can also be used for roaming purposes. Applications or mobile IP or VPN clients of the mobile device accessing the destination network via some other connection may roam automatically to the new connection for accessing the destination network in response to reception of a predetermined response to the at least one predetermined request, which indicates that the new connection is a connection to the destination network.

In case another than the predetermined response is received, this indicates that a connection to the destination network has not been established yet. It may indicate that a user interaction of a user of the mobile device with the wireless access network is required as a preceding step. Thus, a user interaction may be initiated. Initiating a user interaction may consist for example simply in presenting the received response to a user. A possibly required user interaction could be for instance an authentication of a user. In this case, a received logon page could be presented to a user. Alternatively, the wireless access network could require the user for instance simply to accept a legal disclaimer before connectivity is granted.

In case the at least one predetermined request comprises at least two predetermined requests and a non-predetermined response to a first one of the at least two predetermined requests indicates a possibly required user interaction of a user of the mobile device with the wireless access network, a second one of the at least two predetermined requests may be retransmitted, for instance periodically. A detection of a predetermined response to the second one of the at least two predetermined requests may then be considered as an indication of a successfully completed user interaction.

During such a user interaction, user actions may be recorded in a script. The script can then be used for an automatic interaction when the wireless access network is to be used again at a later point of time for accessing the destination network. Preferably, a user is first asked whether the input for the user interaction is to be recorded. Examples of the recordable user actions during an authentication procedure, for instance, include information about the received logon page for future identification of the logon page, what data the user enters to different form fields of the page, which selections the user enters to radio buttons or drop-down lists, and which submit buttons the user presses. The script may contain several steps, in order to support log-on procedures where the local access controller presents several log-on related pages or forms in sequence.

It is to be understood that an indication whether a user interaction is required and, if applicable, the script, can be saved together with the connection.

The reason that there is no reception of a predetermined response may be, for instance, that the wireless access network is a private network that allows access only to a selected group of mobile devices, or that the wireless access network is a public network requiring authentication for which the user of the mobile device is not in possession of the required authentication information. In both cases, the predetermined requests are dropped or intercepted by the wireless access network, and thus no predetermined response is generated and provided.

It may be determined that there is no reception of a predetermined response in case a set timer runs out or in case a user interrupts the waiting, etc.

The at least one predetermined request may be for instance a predetermined HTTP request and/or a predetermined User Datagram Protocol (UDP) request and/or a predetermined Transmission Control Protocol (TCP) request. The STUN protocol requests and responses are another instance of the predetermined requests and responses. The STUN protocol is specified in IETF Request for Comments 3489: "STUN—Simple Traversal of User Datagram Protocol (UDP) Through Network Address Translators (NATs)", March 2003. It is to be understood that other types of requests could be employed as well.

Some of the above mentioned exemplary embodiments will now be presented specifically for HTTP and UDP or TCP messages.

The proposed connectivity test server may be placed in the destination network, for example in the public Internet. When the server receives a request over one or multiple TCP or UDP port numbers as defined by a service provider, it may return an appropriate reply as defined by the service provider.

A simple HTTP server implemented in the connectivity test server could return for instance a test page that is well known to the mobile device. The purpose of the exchange of predetermined HTTP messages is to let the mobile device detect whether there is HTTP access to the Internet or whether there is an intermediate element that blocks or hi-jacks the HTTP session. In the first case, the well-known page can be successfully retrieved. In the second case, an access controller of the wireless access network may return no response or some other response than the well-known response for a browser authentication.

Since the HTTP test allows the mobile device to explicitly know when the user is performing browser authentication, it is possible to record the fact that browser authentication is required for the connection, as indicated above. This fact can later be used in roaming decisions. For example, automatic roaming in the background may not be carried out, if browser authentication is missing, or, depending on the settings of the mobile device, the browser may be automatically started to let the user enter the expected credentials. Furthermore, the mobile device could record the browser authentication itself as a "script" so that in subsequent connections, the authentication can be performed automatically. The "script" is to be understood to be any automation that either helps the user to perform the logon more easily or that completely automates the logon. For example, the browser can record the information that the user enters in the fields of HTML forms and submit buttons the user clicks.

In addition, at least one other non HTTP based service could respond to a predetermined request by the mobile device with a predetermined response. To obtain a more reliable understanding about the level of connectivity, the connectivity test server could provide for instance a couple of UDP or TCP ports for the request/response using standard or proprietary protocols.

Different wireless access networks may employ different firewalls. Some networks might admit only HTTP traffic and block all UDP ports and all other TCP ports. Other networks might block only certain protocols but allow some. Therefore, testing with the HTTP port only may give a misleading picture of the nature of the new connection.

By defining another TCP or UDP protocol number, it is possible to test whether the wireless access network admits non-HTTP traffic to the Internet or whether the local network employs a port-specific firewall that blocks the TCP or UDP ports. For example, the test might use the IPsec Internet Key Exchange and NAT traversal UDP ports 500 and 4500, in order to test whether the local network admits VPN connections to gateways in the Internet. The purpose of the second test service is to be able to quickly test whether there is a general connection—not just HTTP access—to the Internet and to detect whether browser authentication has been already completed.

For example, when a browser authentication is required, the mobile device will still not know when the browser authentication has been completed and the connection to the Internet is established. Therefore, a second predetermined request, for example a predetermined UDP request, may be transmitted repeatedly. The UDP requests are dropped by the wireless access network, but only until the browser authentication has been completed. When the browser authentication has been completed, the wireless access network typically adds the Medium Access Control (MAC) address of the mobile device and/or the Internet Protocol (IP) address of the mobile device to an Access Control List (ACL) in a packet filter firewall so that the packet filter firewall will start forwarding the traffic of the mobile terminal to/from the global Internet. When a predetermined UDP response is obtained after an initiated browser authentication, the mobile terminal will thus know that the browser authentication has been completed.

It is also possible to define an extensible connectivity test framework in the mobile device, so that new tests could be added later for example in the form of new plug-in modules. Such plug-in modules could be provided for instance in the form of software updates.

The wireless access network can use any networking technology that is suited to provide a connection to the Internet or to employ browser authentication. It can be for instance a WLAN, an IP passthrough or a Bluetooth™ Personal Area Network (PAN).

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
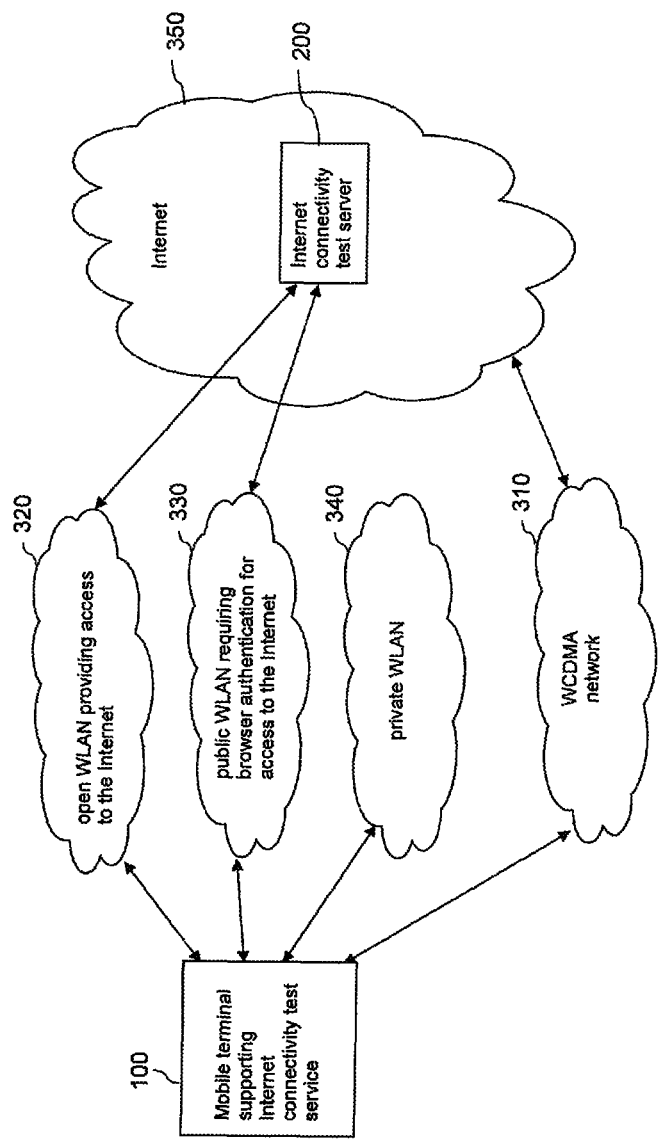
FIG. 1 is a schematic diagram of a system according to an embodiment of the invention.

FIG. 1 is a schematic diagram of an exemplary system, in which an improved Internet access via a wireless access network can be implemented according to an embodiment of the invention.

The system comprises a mobile terminal 100. The mobile terminal 100 is able to access a Wideband Code Division Multiple Access (WCDMA) network 310. In addition, it is able to access IEEE 802.11 based WLANs, for instance an open WLAN 320, a public WLAN 330 requiring a browser authentication or a private WLAN 340. Each of these networks 310, 320, 330, 340 may provide an access to the Internet 350. The access that is provided by private WLAN 340, however, is limited to a specified group of mobile terminal, which does not include mobile terminal 100. The mobile terminal 100 may thus use either the WCDMA network 310 or one of the other WLANs 320, 330 that is available at its current location for retrieving e-mails from the Internet 350, for using Instant Messaging, for viewing Web-pages, etc. It is to be understood that the mobile terminal 100 may also be able to access any other type of wireless access network, which may or may not provide a connection to the Internet 350. In accordance with an embodiment of the invention, the mobile terminal 100 supports an Internet connectivity test service.

In addition, the system comprises an Internet connectivity test server 200 in the Internet 350.

Figure 2:
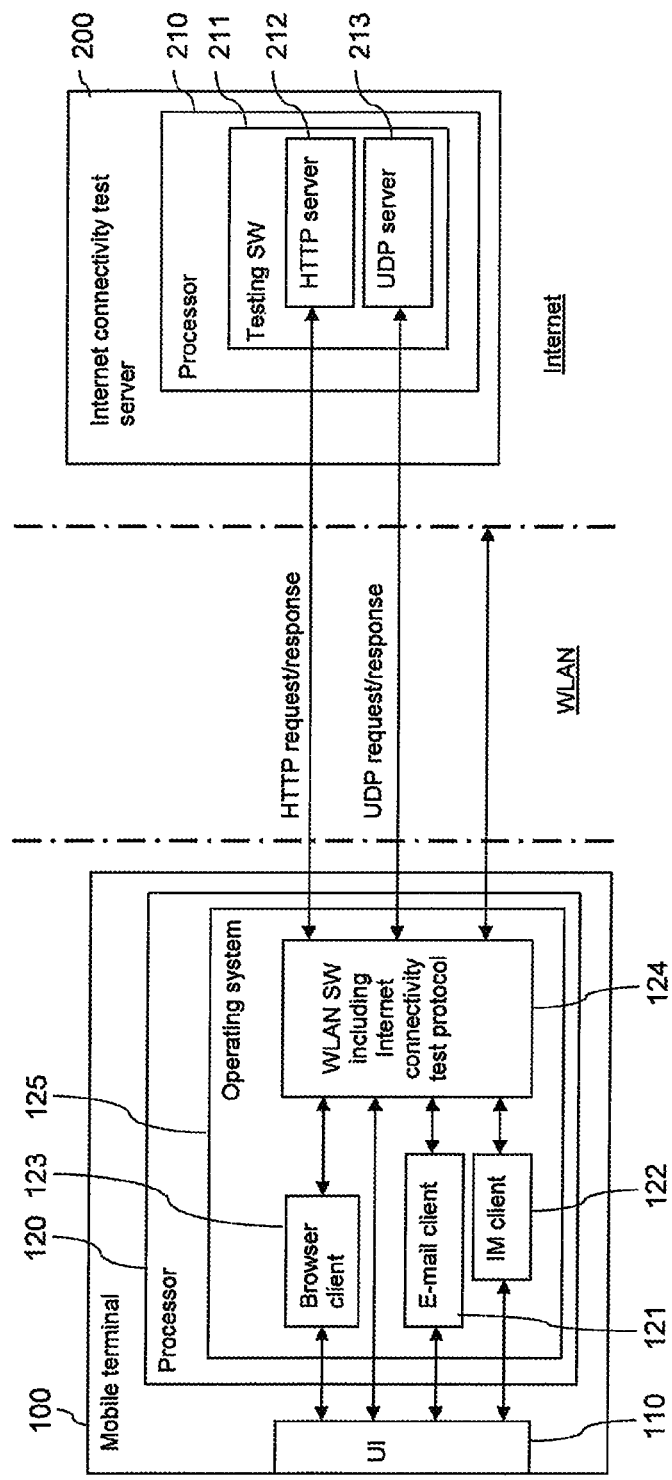
FIG. 2 is a schematic block diagram of elements of the system of FIG. 1.

Some details of the system are presented in FIG. 2.

The mobile terminal 100 comprises a user interface 110, including at least input keys and a display. Further, it comprises a processor 120 that is adapted to execute software code installed in the mobile terminal 100. The software code comprises for instance software code for a variety of applications including an e-mail client 121 and an Instant Messaging client 122. Further, the software code comprises software code for a browser client 123, for a WLAN component 124 and for an operating system or platform 125 of the mobile terminal 100. The WLAN component 124 includes a test protocol for the Internet connectivity test service. The applications 121, 122, 123 and the WLAN component 124 are linked to the user interface 110. In addition, the applications 121, 122, 123 are linked to the WLAN component 124. The applications 121, 122, 123 and the WLAN component 124 run on top of an operating system or platform 125.

It is to be understood that the mobile terminal 100 comprises various other components not shown, including a WCDMA transceiver enabling transmissions to and receptions from the WCDMA network 310 and a WLAN transceiver enabling transmissions to and receptions from the WLANs 320, 330, 340.

The Internet connectivity test server 200 comprises a processor 210 that is adapted to execute software code installed in the Internet connectivity test server 200. The software code includes testing software code 211 with an HTTP server component 212 and a UDP server component 213. Both servers 212, 213 can be addressed by a particular port number of the Internet connectivity test server 200.

It is to be understood that the Internet connectivity test server 200 may also comprise various other components not shown.

Figure 3:
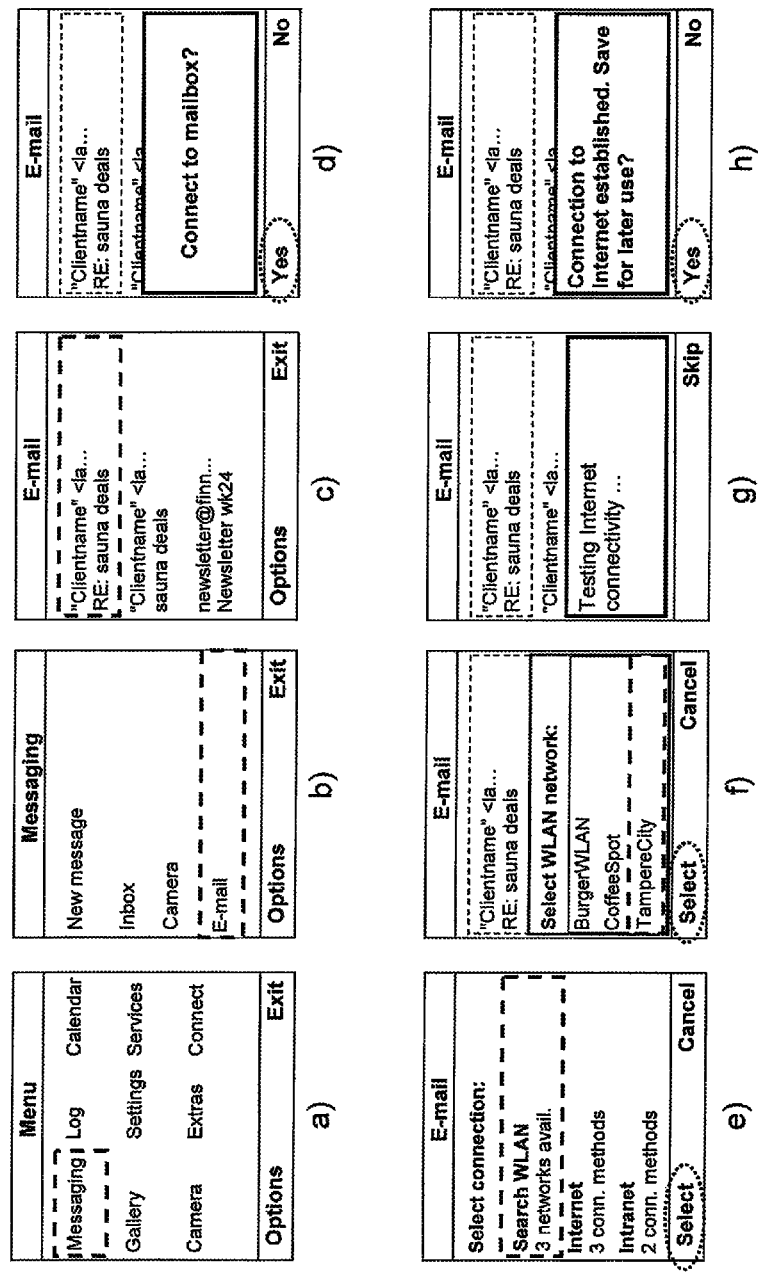
FIGS. 3a to 3n are a sequence of presentations on a display illustrating a first operation in the system of FIG. 1.
Figure 3:
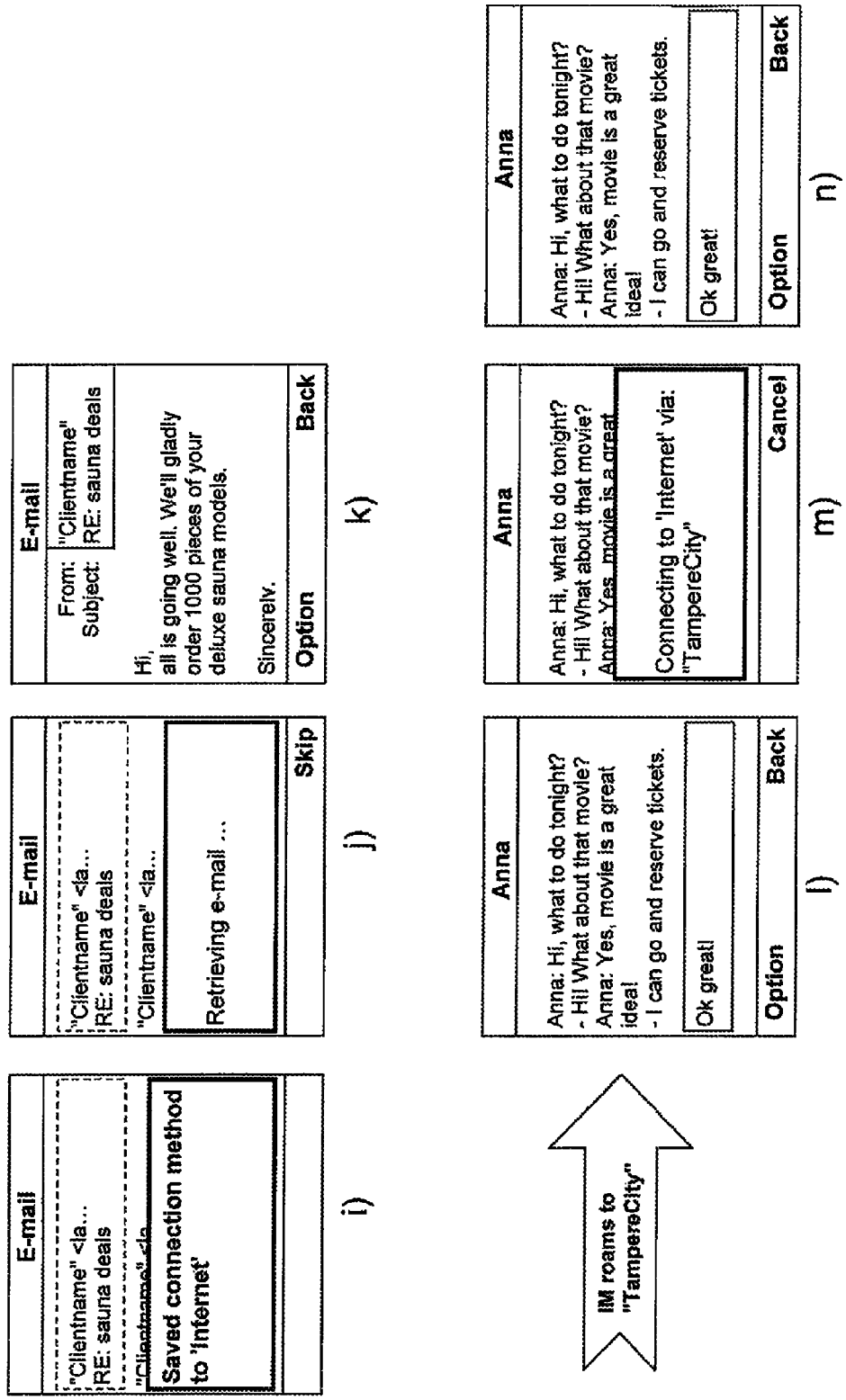
Figure 4:
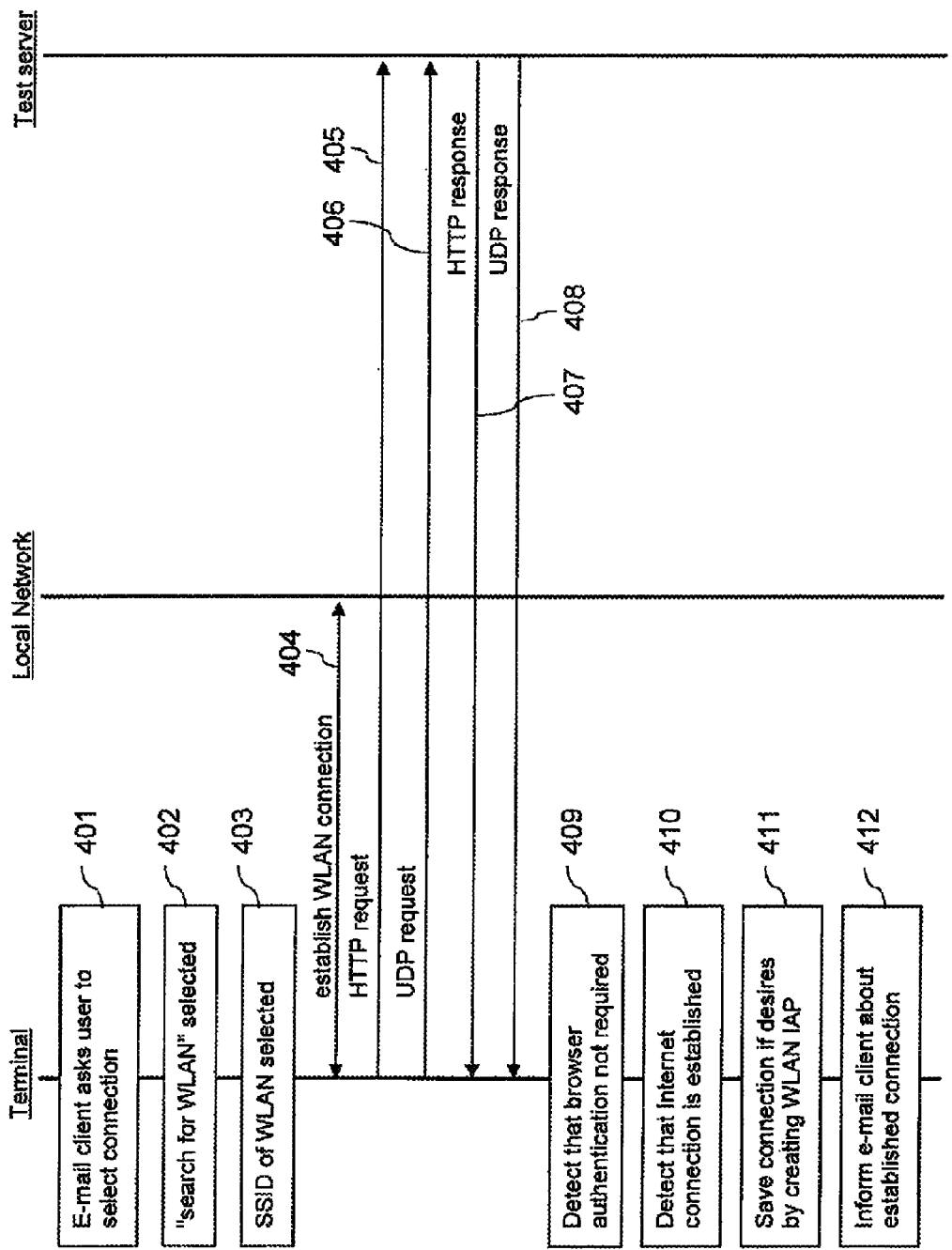
FIG. 4 is a chart illustrating the first operation in the system of FIG. 1.

A first exemplary operation in the system of FIG. 1 will now be explained with reference to FIGS. 3 and 4. FIGS. 3a to 3n are a sequence of presentations on the display of the mobile terminal 100. FIG. 4 is a chart illustrating an associated signal exchange between the mobile terminal 100 and the Internet connectivity test server 200 via the open WLAN 320.

In the mobile terminal 100, Instant Messaging is currently bound to the "Internet" destination network and running over WCDMA.

In FIG. 3a, a user has called the main menu of the mobile terminal 100 and selects the menu item "messaging" in order to get to a messaging menu.

In FIG. 3b, the user launches the e-mail client 121 by selecting the item "e-mail" from the messaging menu, in order to enter the e-mail application.

In FIG. 3c, a list of e-mails is presented which are waiting for download from a mailbox provided by some e-mail server in the Internet 350. The user selects the first e-mail for downloaded.

In FIG. 3d, the user is asked by a pop-up window whether a connection to the mailbox is to be established. The user selects the option "yes", which is associated to one of the softkeys of the mobile terminal 100.

The e-mail client 121 is configured to "always ask" which connection is currently to be used.

The connection selection is managed by the operating system or platform 125. Triggered by the e-mail client 121, the operating system or platform 125 is therefore informed upon request by the available communication components which connection methods are currently available. It is informed for instance by the WLAN component 124 that three WLAN networks are available at the current location. As indicated in FIG. 4, the operating system or platform 125 now causes the user interface 110 to ask the user to select a connection (step 401).

In FIG. 3e, the user is thus asked to select the "Search WLAN" functionality, an Internet connection or an Intranet connection.

The options 'Internet' and 'Intranet' refer to destination networks, where the user expects a certain application server to be available. 'Internet' can be understood as a prioritized list of 'connection methods' that provide a connection to the application servers at the public Internet. The connection methods might include for example a home WLAN connection, a public WLAN hotspot connection and a cellular packet data connection to the Internet. Similarly, 'Intranet' may be understood as a prioritized list of connection methods by which the mobile terminal 100 can reach application servers at an enterprise Intranet. The list might include for example direct campus WLAN connections, dial-up connections to an enterprise dial-up server and VPN connections over public Internet.

The user selects the "Search WLAN" option.

The user selection is provided by the user interface 110 to the operating system or platform 125, which informs the WLAN component 124 accordingly (step 402).

The WLAN component 124 now causes the user interface 110 to present a list of selectable WLANs to the user.

In FIG. 3f, the user is thus asked to select one of three available, listed WLANs, including, by way of example, a WLAN called "BurgerWLAN", a WLAN called "CoffeeSpot" and a WLAN called "TampereCity". The user selects the last WLAN in the list.

The WLAN component 124 interprets this selection as a selection of an associated Service Set Identifier (SSID), as illustrated in FIG. 4 (step 403). The SSID is a network name defined for an IEEE 802.11 based wireless access network.

The WLAN component 124 now establishes a connection to an access point of the selected WLAN 320 (step 404).

The connection is not yet indicated to the e-mail client 121, though. Instead, the WLAN component 124 first runs an Internet connectivity test protocol. In the meantime, a pop-up window indicating "Testing Internet connectivity" may be shown with an option to skip the testing, as illustrated in FIG. 3g.

In the scope of the Internet connectivity test protocol, the WLAN component 124 transmits a predetermined HTTP request and a predetermined UDP request which are addressed to a respective port of the Internet connectivity test server 200 (steps 405, 406).

The selected WLAN 320 is an open WLAN which does not require any browser authentication. Both requests are therefore simply forwarded by the WLAN 320 to the Internet connectivity test server 200.

Upon receipt of the predetermined HTTP request, the HTTP server 212 of the Internet connectivity test server 200 generates a predetermined HTTP response and transmits this response via the WLAN 320 to the mobile terminal 100 (step 407).

Upon receipt of the predetermined UDP request, the UDP server 213 of the Internet connectivity test server 200 generates a predetermined UDP response and transmits this response via the WLAN 320 to the mobile terminal 100 (step 408).

When the WLAN component 124 receives a HTTP response, it determines whether the response corresponds to a predetermined HTTP response, which is known to originate from an Internet connectivity test server. If this is the case, the WLAN component 124 knows that a browser authentication is not required (step 409).

When the WLAN component 124 receives a UDP response, it determines whether the response corresponds to a predetermined UDP response, which is known to originate from an Internet connectivity test server. If this is the case, the WLAN component 124 knows that the addressed UDP port responded and that a connection to the Internet 350 has been established (step 410).

The WLAN component 124 now instructs the user interface 110 to inform the user by means of a pop-up window that a connection to the Internet 350 has been established and to ask whether the connection is to be saved for further use. FIG. 3h presents a corresponding presentation on the display. The user may choose to save the connection by selecting a "yes" option associated to one of the softkeys of the mobile terminal 100. The WLAN component 124 is informed about the selection.

In case the connection is to be saved, the WLAN component 124 saves the connection by creating a WLAN Internet Access Point (IAP), which is a connection profile for this network, and by associating it to the Internet destination network (step 411). This means that the next time the mobile terminal 100 is in the coverage area of this WLAN and it is asked to establish a connection to the 'Internet' destination, the mobile terminal 100 can automatically select this new WLAN connection method. The mobile terminal 100 might select some other connection method instead, if this new connection method is not available or if a higher-priority connection method is available. The WLAN IAP may record the fact that browser authentication was not required in this network. This information may later be used in automatic roaming decisions as an indication that it is appropriate to roam to this network in the background, since no user interaction is required to establish the connection. The WLAN component 124 causes the user interface 110 to inform the user about the saved connection.

In FIG. 3i, the user is informed by a pop-up window of a short duration that the connection method has been saved to 'Internet'.

In addition, the WLAN component 124 informs the e-mail client 121 that a connection to the Internet 350 has been established (step 412).

The e-mail client 121 may now retrieve the requested e-mail using the established Internet connection via the WLAN 320.

FIG. 3j shows that the user is informed by a further pop-up window initiated by the e-mail client 121 that the requested e-mail is being retrieved.

The email is finally presented on the display, as shown in FIG. 3k.

In parallel, the Instant Messaging client 122 roams from the WCDMA network 310 to the "TampereCity" WLAN 320 for accessing the Internet 350. The roaming is performed automatically, since the Instant Messaging client 122 is bound to the "Internet" as a destination network, and the Internet Connectivity Test has detected that WLAN 320 provides connectivity to the Internet.

FIG. 3l shows a display with an ongoing Instant Messaging. Upon the automatic roaming to the new connection from the WCDMA network 310, a pop-up window is presented on the display, as shown in FIG. 3m, which indicates to the user that the mobile terminal 100 is connecting to the "Internet" via the WLAN 320 "TampereCity". Once the connection has been established, the preceding Instant Messaging presentation is displayed again, as shown in FIG. 3n.

Figure 5:
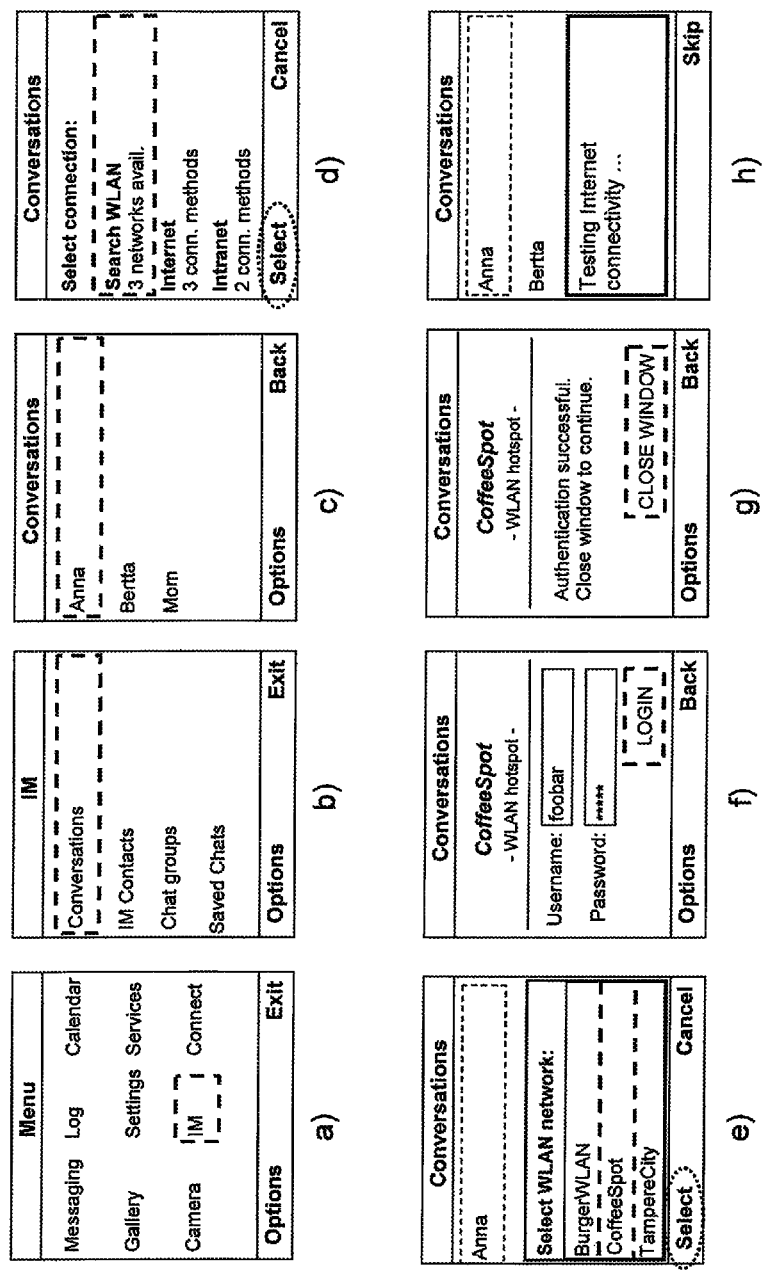
FIGS. 5a to 5n are a sequence of presentations on a display illustrating a second operation in the system of FIG. 1
Figure 5:
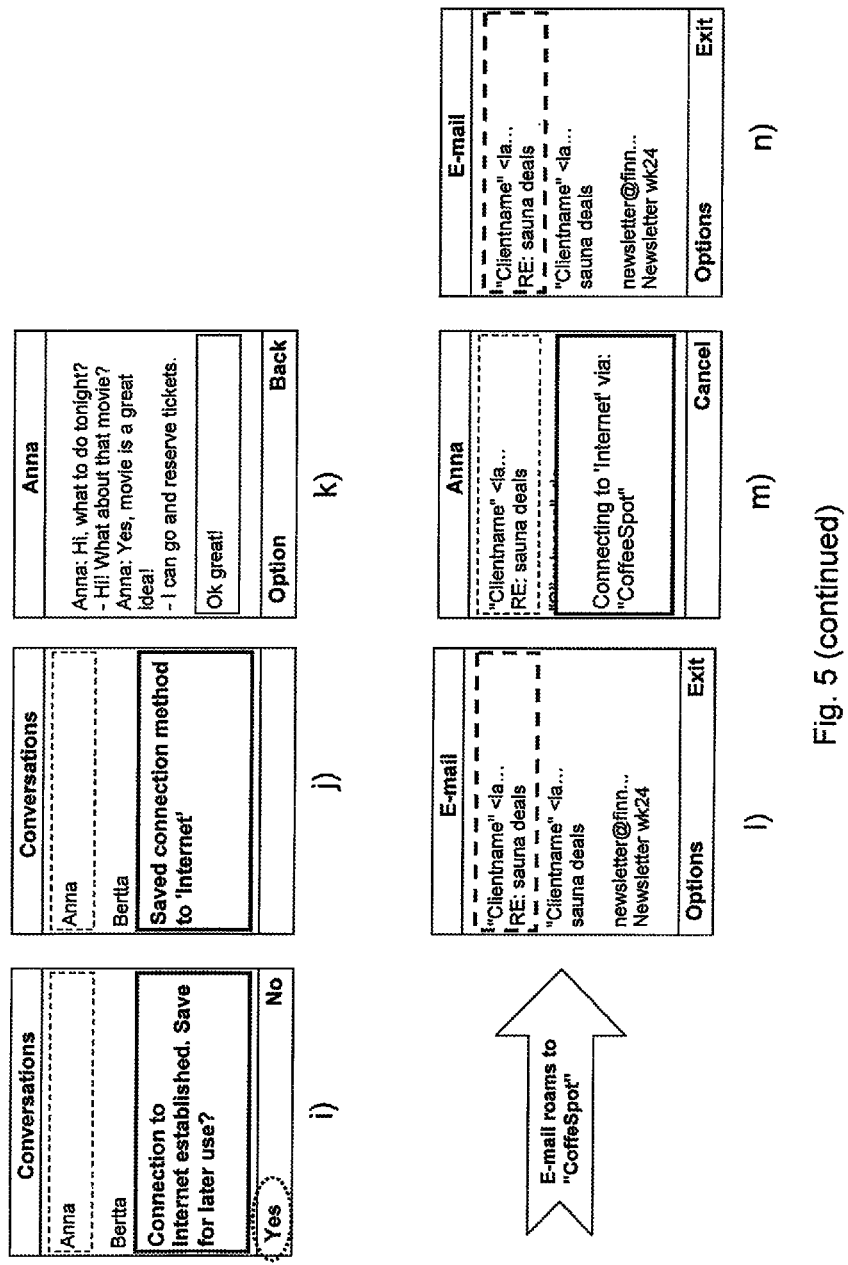
Figure 6:
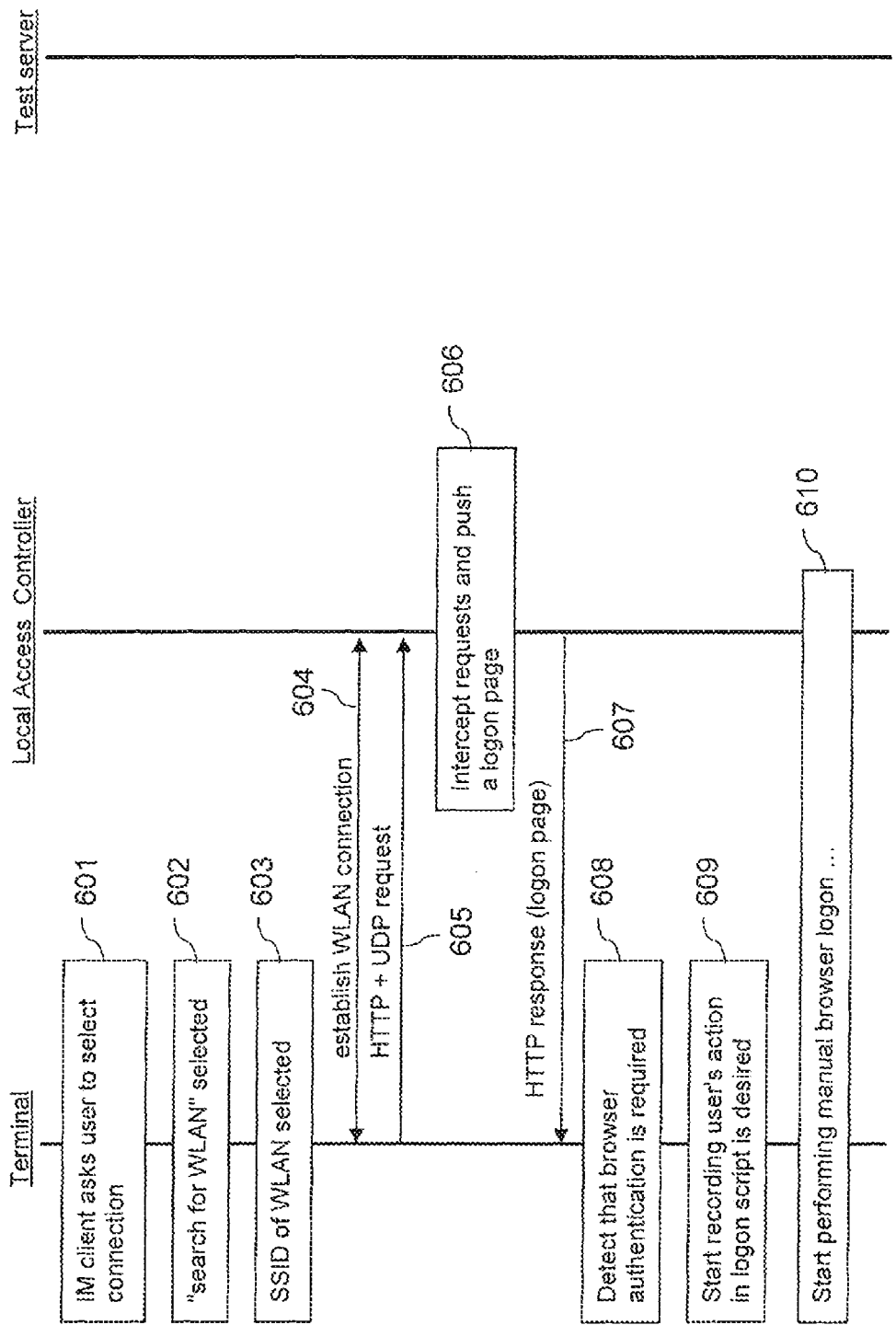
FIG. 6 is a chart illustrating the second operation in the system of FIG. 1.
Figure 6:
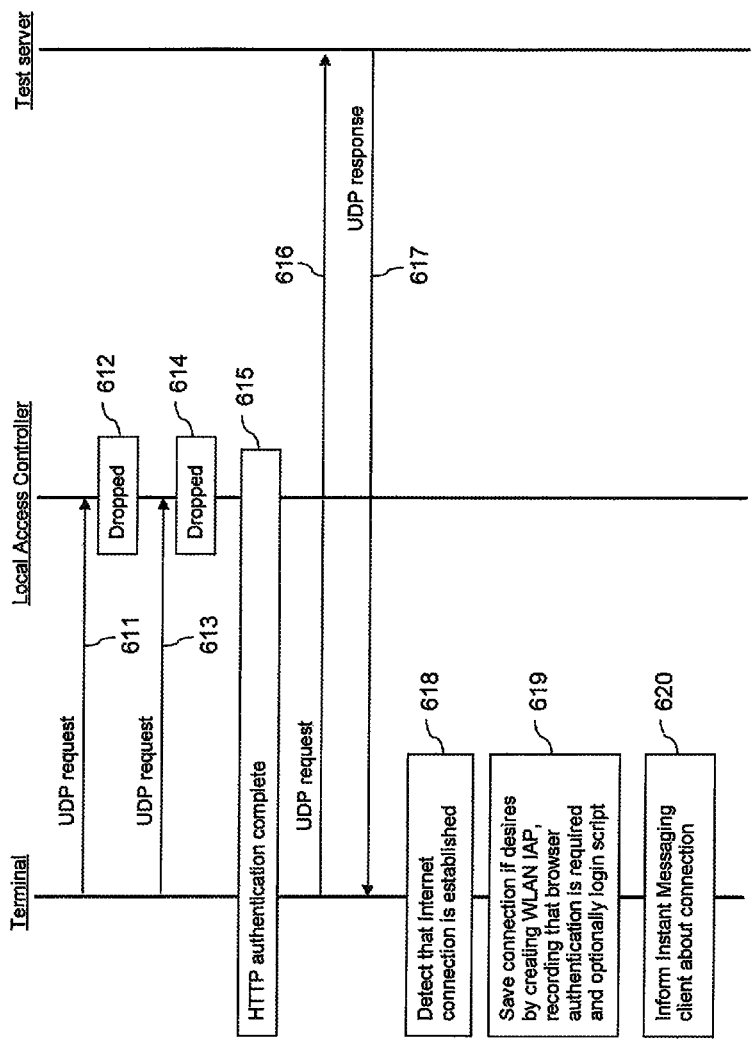

A second exemplary operation in the system of FIG. 1 will now be explained with reference to FIGS. 5 and 6. FIGS. 5a to 5n are a sequence of presentations on the display of the mobile terminal 100. FIG. 6 is a chart illustrating an associated signal exchange between the mobile terminal 100 and the Internet connectivity test server 200 via the public WLAN 330.

In the mobile terminal 100, the e-mail client 121 is currently bound to the "Internet" destination network and running over WCDMA.

In FIG. 5a, a user has called the main menu of the mobile terminal 100 and selects the menu item "IM" in order to launch the Instant Messaging client 122.

The Instant Messaging client 122 provides thereupon an Instant Messaging menu for presentation. In FIG. 5b, the user selects the item "conversation" from the Instant Messaging menu, in order to enter an Instant Messaging conversation.

In FIG. 5c, a list of conversational partners is presented. The user selects the first conversational partners "Anna".

The Instant Messaging client 122 is configured to "always ask" which connection is currently to be used.

Triggered by the Instant Messaging client 122, the operating system or platform 125 is therefore informed upon request by the available communication components which connection methods are currently available. It is informed for instance by the WLAN component 124 that three WLAN networks are available at the current location. As indicated in FIG. 6, the operating system or platform 125 now causes the user interface 110 to ask the user to select a connection (step 601).

In FIG. 5d, the user is thus asked to select the "Search WLAN" functionality, an Internet connection or an Intranet connection. The user selects the "Search WLAN" option.

The user selection is provided by the user interface 110 to the operating system or platform 125, which informs the WLAN component 124 accordingly (step 602).

The WLAN component 124 now causes the user interface 110 to present a list of selectable WLANs to the user.

In FIG. 5e, the user is thus asked to select one of three available, listed WLANs, including again, by way of example, a WLAN called "BurgerWLAN", a WLAN called "CoffeeSpot" and a WLAN called "TampereCity". The user selects the "CoffeeSpot" WLAN.

The WLAN component 124 interprets this selection as a selection of an associated Service Set Identifier (SSID), as illustrated in FIG. 6 (step 603).

The WLAN component 124 now establishes a connection to the access point of the selected WLAN 330 (step 604).

The connection is not yet indicated to the Instant Messaging client, though.

Instead, the WLAN component 124 first runs the Internet connectivity test protocol. In this scope, it transmits the predetermined HTTP request and the predetermined UDP request to the Internet connectivity test server 200 (step 605).

The selected WLAN 330 is a public WLAN, which provides access to the Internet 350 but which demands to this end a browser authentication.

A local access controller of the WLAN 330 therefore intercepts the HTTP and UDP requests and pushes a logon page to the mobile terminal 100 (step 606).

The logon page is provided to the mobile terminal 100 in a HTTP response message (step 607).

When the WLAN component 124 receives the HTTP response, it determines whether the response corresponds to the predetermined HTTP response, which is known to originate from an Internet connectivity test server. If this is not the case, the WLAN component 124 knows that a browser authentication is required (step 608).

The WLAN component 124 forwards the HTTP logon page to the browser client 123. The browser client 123 presents the logon page on the display for enabling the user to perform a manual browser logon (step 610). During the browser logon, the WLAN component 124 may record the actions of the user in a logon script, possibly after having inquired whether the user desires such a recording (step 609).

In FIG. 5f, the logon page is presented in a pop-up browser window. The browser window enables the user to enter a username and a password. When both have been entered, the user may select a "LOGIN" option to continue.

During the browser authentication process, the WLAN component 124 continues transmitting the predetermined UDP request to the Internet connectivity test server (steps 611, 613). As long as the browser authentication has not been completed, the local access controller of the WLAN 330 simply drops the received UDP requests (steps 612, 614).

When the browser authentication has been successfully completed (step 615), the browser client 123 informs the user accordingly by a HTTP page indicating that the authentication was successful. The user is further requested to select a "close window" option to continue, as indicated in FIG. 5g. Alternatively, the window could be left in the foreground while running the Internet Connectivity test and later, once the UDP test has succeeded, the browser window could be automatically moved to the background so that the Instant Messaging application comes to the foreground again.

A pop-up window indicating "Testing Internet connectivity" may be shown again during the testing procedure, as illustrated in FIG. 5h. This window may be omitted during the entire browser authentication, though.

The next predetermined UDP request from the WLAN component 214 is now forwarded by the local access controller of the WLAN 330 to the Internet 350 so that it reaches the addressed Internet connectivity test server 200 (step 616).

Upon receipt of the predetermined UDP request, the UDP server 213 of the Internet connectivity test server 200 generates the predetermined UDP response and transmits this response via the WLAN 330 to the mobile terminal 100 (step 617).

When the WLAN component 124 receives a UDP response, it determines whether the response corresponds to a predetermined UDP response, which is known to originate from an Internet connectivity test server. If this is the case, the WLAN component 124 knows that the addressed UDP port responded and that a connection to the Internet 350 has been established (step 618).

The WLAN component 124 now instructs the user interface 110 to inform the user by means of a pop-up window that a connection to the Internet 350 has been established and to ask whether the connection is to be saved for further use. FIG. 5*i* presents the corresponding presentation on the display. The user may choose to save the connection by selecting a "yes" option associated to one of the softkeys of the mobile terminal 100. The WLAN component 124 is informed about the selection.

In case the connection is to be saved, the WLAN component 124 saves the connection by creating a WLAN IAP and by associating it to the Internet destination network (step 619). The WLAN IAP comprises the information that a browser authentication is required for this specific connection. In addition, a login script is included, in case the user actions during the browser authentication have been recorded.

The WLAN component 124 causes the user interface 110 to inform the user about the saved connection.

In FIG. 5*j*, the user is informed by a pop-up window of a short duration that the connection method has been saved to 'Internet'.

In addition, the WLAN component 124 informs the Instant Messaging client 122 that a connection to the Internet 350 has been established (step 620).

The user may now continue with the Instant Messaging using the established Internet connection via the WLAN, as indicated in FIG. 5*k*.

In parallel, the e-mail client 121 roams from the WCDMA network 310 to the "CoffeSpot" WLAN 330 for accessing the Internet 350. The roaming is performed automatically, since the e-mail client 121 is bound to the "Internet" as a destination network, and the Internet Connectivity Test has now detected that WLAN 330 provides connectivity to the Internet.

FIG. 5*l* shows a list of new e-mails that are available for a download. Upon the automatic roaming to the new connection, a pop-up window is presented on the display, as shown in FIG. 5*m*. The window indicates to the user that the mobile terminal 100 is connecting to the "Internet" via the WLAN 330 "CoffeeSpot". Once the connection has been established, the preceding e-mail window is shown again, as indicated in FIG. 5*n*.

Figure 7:
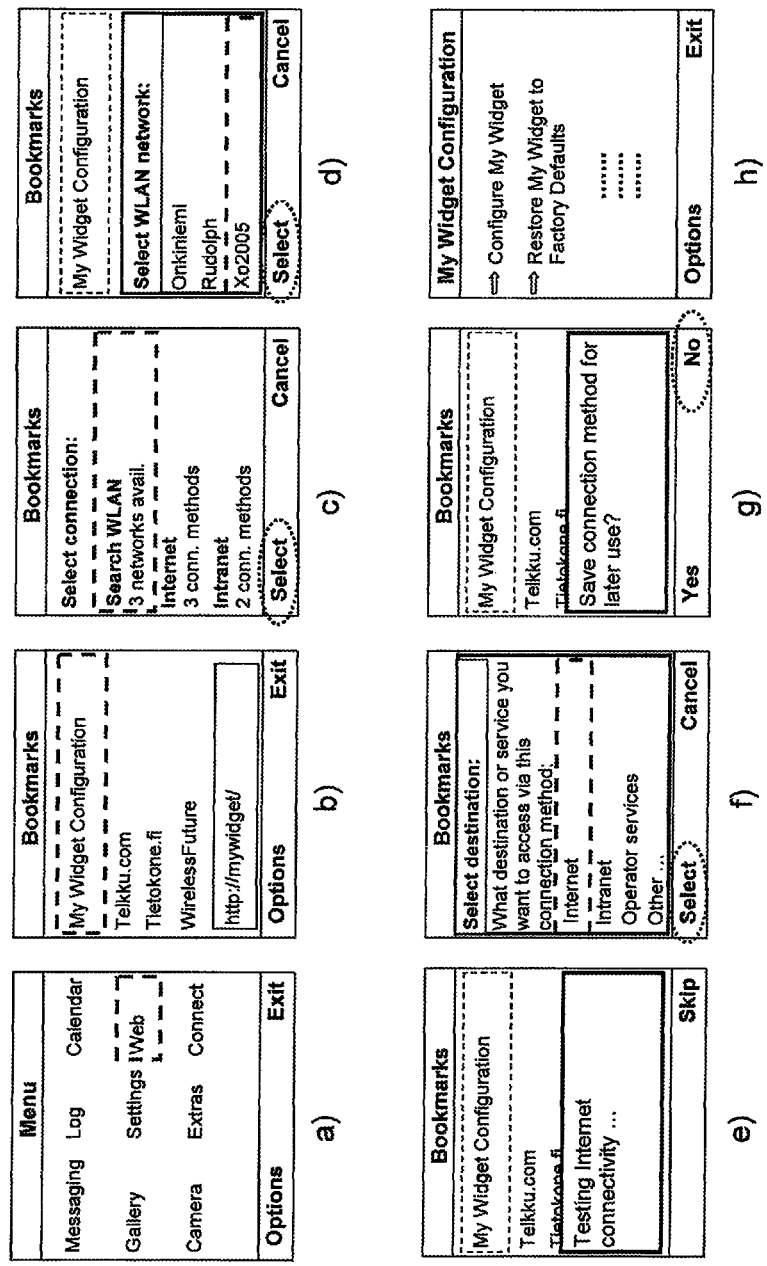
FIGS. 7a to 7h are a sequence of presentations on a display illustrating a third operation in the system of FIG. 1.
Figure 8:
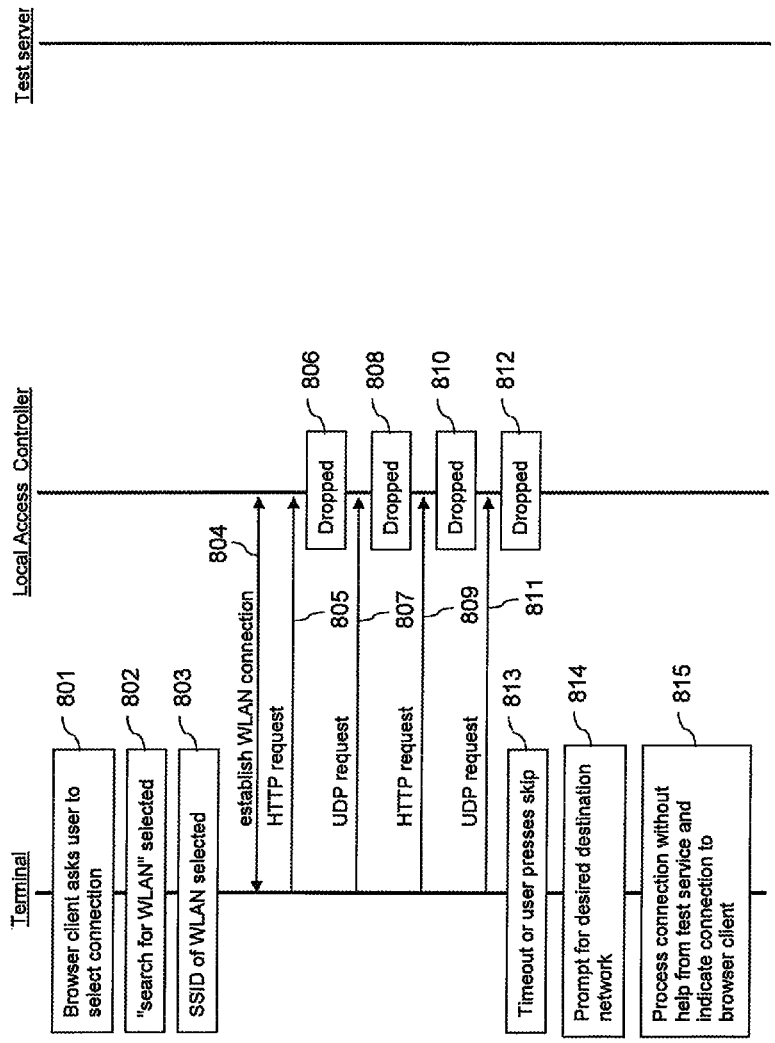
FIG. 8 is a chart illustrating the third operation in the system of FIG. 1.

A third exemplary operation in the system of FIG. 1 will now be explained with reference to FIGS. 7 and 8. FIGS. 7*a* to 7*h* are a sequence of presentations on the display of the mobile terminal 100. FIG. 8 is a chart illustrating an associated signal exchange between the mobile terminal 110 and a private WLAN 340.

In FIG. 7*a*, a user has called the main menu of the mobile terminal 100 and selects the menu item "Web" in order to launch the browser client 123.

The browser client 123 provides thereupon a list of bookmarks. In FIG. 7*b*, the list of bookmarks is presented. The user selects the item "My Widget Configuration" from the list, in order to connect to a web-based configuration interface of an electronic appliance. The web-link that is associated to the bookmark is indicated at the bottom of the display.

The browser client 123 is configured to "always ask", which connection is currently to be used for accessing a selected Internet page.

Triggered by the browser client 123, the operating system or platform 125 is therefore informed upon request by the available communication components which connection methods are currently available. It is informed for instance by the WLAN component 124 that three WLAN networks are available at the current location. As indicated in FIG. 8, the operating system or platform 125 now causes the user interface 110 to ask the user to select a connection (step 801).

In FIG. 7*c*, the user is thus asked to select the "Search WLAN" functionality, an Internet connection or an Intranet connection. The user selects the "Search WLAN" option.

The user selection is provided by the user interface 110 to the operating system or platform 125, which informs the WLAN component 124 accordingly (step 802).

The WLAN component 124 now causes the user interface 110 to present a list of selectable WLANs to the user.

In FIG. 7*d*, the user is thus asked to select one of three available, listed WLANs, including, by way of example, a WLAN called "Onkiniemi", a WLAN called "Rudolph" and a WLAN called "Xo2005". The user selects the last WLAN in the list.

The WLAN component 124 interprets this selection as a selection of an associated Service Set Identifier (SSID), as indicated in FIG. 8 (step 803).

The WLAN component 124 now establishes a connection to the access point of the selected WLAN 340 (step 804).

The connection is not yet indicated to the browser client 123, though. Instead, the WLAN component 124 first runs an Internet connectivity test protocol. In the meantime, a pop-up window indicating "Testing Internet connectivity" may be shown with an option to skip the testing, as illustrated in FIG. 7*e*.

In the scope of the Internet connectivity test protocol, the WLAN component 124 transmits a predetermined HTTP request and a predetermined UDP request which are addressed to a respective port of the Internet connectivity test server 200 (steps 805, 807).

As the WLAN 340 is a private WLAN, which only provides an access to a private and unconnected network, both requests are not forwarded to the global Internet 350 by the WLAN 340 (steps 806, 808). Alternatively, a local access controller of the WLAN 340 could respond to the HTTP request with some local box in a pop-up window of the mobile terminal 100, which is dismissed by the user.

The WLAN component 124 thus receives no response to its requests. It continues transmitting requests (steps 809, 811), which are dropped by the local access controller of the WLAN 340 (steps 810, 812), until a timer runs out or until the user selects the skip option (step 813). The WLAN component 124 assumes that a connection to the Internet 350 via the selected WLAN 340 is not possible.

The WLAN component 124 now prompts for a destination network (step 814). That is, the user is asked to instruct the mobile terminal 100 to which destination network the new connection belongs. If there are other applications connected to the same destination, they could then roam to this new connection. The user may be provided for the instruction for instance with a list comprising the Internet, an Intranet, an operator service or other networks for a presentation on the display, as indicated in FIG. 7*f*. Further, a selection option could be provided for the case that the user does not care which kind of connection is established.

The WLAN component 124 is informed about the selection and processes the selected connection in a conventional way without any help from the Internet connectivity test service (step 815).

The WLAN component 124 now instructs the user interface 110 to inform the user by means of a pop-up window that a connection to the WLAN network "Xo2005" 340 has been established and to ask whether the connection is to be saved for further use. FIG. 7g presents a corresponding presentation on the display. The user may choose not to save the connection by selecting a "no" option associated to one of the softkeys of the mobile terminal 100. The WLAN component 124 is informed about the selection.

In addition, the WLAN component 124 informs the browser client 123 that a connection has been established (step 815).

The browser client 123 accesses thereupon the selected Web-site using the established WLAN connection and presents the provided HTML page to the user, as indicated in FIG. 7h.

Summarized, the presented exemplary embodiment of the invention enables a mobile terminal to detect when it has connectivity to the public Internet, to detect whether browser authentication is required and to detect when browser authentication has been successfully completed.

Since the mobile terminal can automatically detect connectivity to the public Internet, new connections can be indicated to applications or clients at the right time. Further, previously unknown WLAN connections can be used for roaming. The browser authentication is equally simplified, since the mobile terminal knows when it is required. The usability of the mobile terminal is improved by reducing user interaction with the mobile terminal and by enabling automatic browser authentication with recorded scripts.

It is to be noted that the described embodiment constitutes only one of a variety of possible embodiments of the invention.

What is claimed is:

1. A method comprising:
generating at least one predetermined request at a mobile device with wireless transceiver for testing whether a wireless access network enables at leaast some access to a destination network, the at least one predetermined request addressed to a connectivity test server in the destination network and the connectivity test server configured for providing a test service for testing a successful access to the destination network, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request;
transmitting said at least one predetermined request to the wireless access network, the destination network being a first network and the wireless access network being a second network; and
determining whether a response to said at least one predetermined request is received from said wireless access network and whether a received response corresponds to a predetermined response which is known to be provided by said connectivity test server in case said connectivity test server is reached by said at least one predetermined request, wherein reception of the predetermined response to said at least one predetermined request is considered to indicate a connection to said destination network, and wherein a reception comprising at least another response than the predetermined response to said at least one predetermined request is considered to indicate that at least part of the wireless access network is blocking at least part of the access to said destination network.

2. The method according to claim 1, wherein said access to said destination network is requested by at least one application of said device, said method further comprising informing said at least one application about said connection to said destination network.

3. The method according to claim 1, further comprising saving said connection for further use.

4. The method according to claim 1, wherein:
the wireless access network is a WLAN; and
the destination network is the Internet.

5. The method according to claim 1, wherein the at least one predetermined request is provided for transmission via a wireless local access network (WLAN) transceiver of the device, the WLAN transceiver enabling transmissions to and receptions from a WLAN and the device further comprising a wideband code division multiple access (WCDMA) transceiver enabling transmissions to and receptions from a WCDMA network.

6. The method according to claim 1, further comprising in the case a received response is another response than the predetermined response the device presenting a logon page to the user.

7. The method according to claim 1, wherein:
the destination network is the Internet and the wireless access network is a WLAN and wherein, prior to generation of the at least one predetermined request, said wireless access network is unknown to said device.

8. The method according to claim 1, wherein said device is a mobile terminal.

9. The method according to claim 1, wherein said at least one predetermined request comprises at least two predetermined requests, and wherein in case another response than a predetermined response to a first one of said at least two predetermined requests indicates a required user interaction of a user of said device with said wireless access network, said method further comprising transmitting a second one of said at least two predetermined requests, a detection of a predetermined response to said second one of said at least two predetermined requests being an indication of a successfully completed user interaction.

10. The method according to claim 1, wherein, prior to generation of the at least one predetermined request, said wireless access network is unknown to said device.

11. The method according to claim 1, further comprising saving said connection for further use.

12. The method according to claim 1, wherein applications of said device accessing said destination network via another connection roam to said connection for accessing said destination network in response to reception of a predetermined response to said at least one predetermined request.

13. The method according to claim 1, wherein:
the wireless access network is configured to provide access to the destination network after a browser authentication.

14. The method according to claim 1, wherein the destination network is one of a public Internet, a private network, an enterprise intranet or an operator service network.

15. The method according to claim 1, wherein the wireless access network is one of a public wireless local access network, a private wireless local access network or a wideband code division multiple access network.

16. The method according to claim 1, further comprising initiating a user interaction in the case of receipt of another response than a predetermined response to said at least one predetermined request, and wherein said initiating a user interaction is responsive, at least in part, to said another response than a predetermined response indicating a required user interaction of a user of said device with said wireless access network.

17. The method according to claim 16, further comprising recording said user interaction in a script.

18. The method according to claim 16, wherein initiating a user interaction comprises at least one of:
presenting said another response than a predetermined response to the user;
presenting a logon page to the user; or
requiring a user to accept a legal disclaimer;
and wherein:
the wireless access network is a WLAN; and
the destination network is the Internet; and
wherein, prior to generation of the at least one predetermined request, said wireless access network is unknown to said device.

19. The method according to claim 1, including using the at least one predetermined request to differentiate between partial blocking of access to said destination network and full blocking of access to said destination network and wherein the full blocking of access comprises blocking of all protocols of the device and wherein the partial blocking of access involves blocking less than all protocols of the device and wherein the destination network is the Internet and the wireless access network is a WLAN.

20. The method according to claim 1, including determining whether the at least part of the wireless access network is blocking certain device protocols but not others and wherein the destination network is the Internet and the wireless access network is a WLAN.

21. The method according to claim 1, including using the at least one predetermined request to determine whether a wireless access network firewall is blocking certain protocols but not others and wherein the destination network is the Internet and the wireless access network is a WLAN.

22. The method according to claim 1, using the at least one predetermined request to determine if browser authentication has been completed and wherein the destination network is the Internet and the wireless access network is a WLAN.

23. The method according to claim 1, wherein:
the wireless access network is a WLAN; and
the destination network is the Internet; and
wherein the device further comprises a wideband code division multiple access (WCDMA) transceiver enabling transmissions to and receptions from a WCDMA network.

24. A method comprising:
receiving, by a connectivity test server of a destination network, at least one predetermined request from a device via a wireless access network, which at least one predetermined request has been transmitted by the device for testing whether the wireless access network enables at least some access to said destination network, the destination network being a first network and the wireless access network being a second network, and the connectivity test server being configured for providing a test service for testing a successful access to the destination network, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request; and
generating, by the connectivity test server, a predetermined response to said at least one received predetermined request, said predetermined response being known at the device, and transmitting said predetermined response to said device via said wireless access network, wherein reception of said predetermined response to said at least one predetermined request at said device is considered to indicate a connection to said destination network, and wherein a reception comprising at least another response than said predetermined response to said at least one predetermined request at said device is considered to indicate that at least part of the wireless access network is blocking at least part of the access to said destination network.

25. An apparatus comprising a processor, memory, software code, and a wireless transceiver enabling the apparatus to transmit to and receive from a wireless access network,
the software code and the memory configured to, with the processor, cause the apparatus to generate at least one predetermined request for testing whether the wireless access network enables at least some access to a destination network, the at least one predetermined request addressed to a connectivity test server in the destination network, wherein the connectivity test server is configured for providing a test service for testing a successful access to the destination network, and wherein said at least one predetermined request comprises at least one of a predetermined hypertext transfer protocol request, a predetermined user datagram protocol request, a predetermined transmission control protocol request, or a predetermined simple traversal of user datagram protocol through network address translators request;
the software code and the memory configured to, with the processor, cause the apparatus to provide said at least one predetermined request for transmission to the wireless access network, the destination network being a first network and the wireless access network being a second network;
the software code and the memory configured to, with the processor, cause the apparatus to determine whether a response to a transmitted at least one predetermined request is received from said wireless access network and whether a received response corresponds to a predetermined response which is known to be provided by said connectivity test server in case said connectivity test server is reached by said at least one predetermined request; and
the software code and the memory configured to, with the processor, cause the apparatus to consider reception of said predetermined response to said at least one predetermined request to indicate a connection to said destination network, and to consider a reception comprising at least another response than said predetermined response to said at least one predetermined request to indicate that at least part of the wireless access network is blocking at least part of the access to said destination network.

26. The apparatus according to claim 25, said software code and the memory being configured to, with the processor, cause the apparatus to enable an application to request access to said destination network, and said software code and the memory being configured to, with the processor, cause the apparatus to inform said application about said connection to said destination network.

27. The apparatus according to claim 25, said software code and the memory being configured to, with the processor, cause the apparatus to use the at least one predetermined request to determine if a user interaction has been completed and wherein the destination network is the Internet and the wireless access network is a WLAN.

28. The apparatus according to claim 25, wherein said apparatus comprises another wireless transceiver, the another wireless transceiver comprises a wideband code division multiple access (WCDMA) transceiver enabling transmissions to and receptions from a WCDMA network.

29. The apparatus according to claim 25, wherein:
the wireless access network is a WLAN; and
the destination network is the Internet.

30. The apparatus according to claim 25, wherein the at least one predetermined request is provided for transmission via a wireless local access network (WLAN) transceiver of the apparatus, the WLAN transceiver enabling transmissions to and receptions from a WLAN and the apparatus further comprising a wideband code division multiple access (WCDMA) transceiver enabling transmissions to and receptions from a WCDMA network.

31. The apparatus according to claim 25, wherein for the case a received response is another response than the predetermined response, said software code and the memory being configured to, with the processor, cause the apparatus to at least present a logon page to the user.

32. The apparatus according to claim 25, wherein:
the destination network is the Internet and the wireless access network is a WLAN which is configured to provide access to the Internet wherein, prior to generation of the at least one predetermined request, said wireless access network is unknown to said apparatus.

33. The apparatus according to claim 25, wherein said apparatus is a mobile apparatus.

34. The apparatus according to claim 25, wherein said at least one predetermined request comprises at least two predetermined requests that are transmitted, said software code and said memory being configured to, with the processor, cause the apparatus to retransmit a second one of said at least two predetermined requests in case another response than a predetermined response to a first one of said at least two predetermined requests indicates a possibly required user interaction of a user of said apparatus with said wireless access network, a detection of a predetermined response to said retransmitted second one of said at least two predetermined requests being an indication of a successfully completed user interaction; and wherein:
the wireless access network is a WLAN; and
the destination network is the Internet; and
wherein, prior to generation of the at least one predetermined request, said wireless access network is unknown to said apparatus.

35. The apparatus according to claim 25, wherein, prior to generation of the at least one predetermined request, said wireless access network is unknown to said apparatus.

36. The apparatus according to claim 25, wherein said software code and said memory are further configured to, with the processor, cause the apparatus to save said connection for further use.

37. The apparatus according to claim 25, wherein applications of said apparatus accessing said destination network via another connection are configured to roam to said connection for accessing said destination network in response to reception of a predetermined response to said at least one predetermined request;
and further wherein:
the wireless access network is a WLAN; and
the destination network is the Internet; and
wherein, prior to generation of the at least one predetermined request, said wireless access network is unknown to said device.

38. The apparatus according to claim 25, wherein:
the wireless access network is a WLAN and is configured to provide access to the destination network after a browser authentication and wherein the destination network is the Internet.

39. The apparatus according to claim 25, wherein the destination network is one of a public Internet, a private network, an enterprise intranet or an operator service network.

40. The apparatus according to claim 25, wherein the wireless access network is one of a public wireless local access network, a private wireless local access network or a wideband code division multiple access network.

41. The apparatus according to claim 25, said software code and the memory are configured to, with the processor, cause the apparatus to initiate a user interaction in the case of receipt of another response than a predetermined response to said at least one predetermined request and wherein said initiating a user interaction is responsive, at least in part, to said another response than a predetermined response indicating a required user interaction of a user of said apparatus with said wireless access network.

42. The apparatus according to claim 41, wherein said software code and the memory being configured to, with the processor, cause the apparatus to record said user interactions in a script, if allowed by a user and wherein, prior to generation of the at least one predetermined request, said wireless access network is unknown to said apparatus and wherein the destination network is the Internet and the wireless access network is a WLAN which is configured to provide access to the Internet.

43. The apparatus according to claim 25, wherein the apparatus through use of the at least one predetermined request is configured to differentiate between partial blocking of access to said destination network and full blocking of access to said destination network and wherein the full blocking of access comprises blocking of all protocols of the apparatus and wherein the partial blocking of access involves blocking less than all protocols of the apparatus and wherein the destination network is the Internet and the wireless access network is a WLAN.

44. The apparatus according to claim 25, wherein the apparatus is configured to determine whether the at least part of the wireless access network is blocking certain apparatus protocols but not others and wherein the destination network is the Internet and the wireless access network is a WLAN.

45. The apparatus according to claim 25, wherein the apparatus through use of the at least one predetermined request is configured to determine whether a wireless access network firewall is blocking certain protocols but not others and wherein the destination network is the Internet and the wireless access network is a WLAN.

46. The apparatus according to claim 25, wherein the apparatus through use of the at least one predetermined request is configured to determine if browser authentication has been completed and wherein the destination network is the Internet and the wireless access network is a WLAN.

47. The apparatus according to claim 25, wherein:
the wireless access network is a WLAN; and
the destination network is the Internet; and
wherein the device further comprises a wideband code division multiple access (WCDMA) transceiver enabling transmissions to and receptions from a WCDMA network.

48. An apparatus comprising a processor, memory and software code,
- the software code and the memory configured to, with the processor, cause a connectivity test server of a destination network to receive at least one predetermined request from a device via a wireless access network, which at least one predetermined request has been transmitted by the device for testing whether the wireless access network enables at least some access to said destination network, the destination network being a first network and the wireless access network being a second network and the connectivity test server being configured for providing a test service for testing a successful access to the destination network, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request; and
- the software code and the memory configured to, with the processor, cause the connectivity test server to generate a predetermined response to at least one received predetermined request, said predetermined response being known at the device, and to provide said predetermined response for transmission to said device via said wireless access network, wherein reception of said predetermined response to said at least one predetermined request at said device is considered to indicate a connection to said destination network, and wherein a reception comprising of at least another response than said predetermined response to said at least one predetermined request at said device is considered to indicate that at least part of the wireless access network is blocking at least part of the access to said destination network.

49. The apparatus according to claim 48, wherein said apparatus is a server.

50. A non-transitory readable medium stored with software code, said software code configured to cause a device with wireless transceiver to perform the following when executed by a processor of said device:
- generate at least one predetermined request for testing whether a wireless access network enables at least some access to a destination network, the at least one predetermined request addressed to a connectivity test server in the destination network and the connectivity test server being configured for providing a test service for testing a successful access to the destination network, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request;
- provide said at least one predetermined request for transmission to the wireless access network, the destination network being a first network and the wireless access network being a second network; and
- determine whether a response to said at least one predetermined request is received from said wireless access network and whether a received response corresponds to a predetermined response which is known to be provided by said connectivity test server in case said connectivity test server is reached by said at least one predetermined request, wherein reception of said predetermined response to said at least one predetermined request is considered to indicate a connection to said destination network, and wherein a reception comprising at least another response than said predetermined response to said at least one predetermined request is considered to indicate that at least part of the wireless access network is blocking at least part of the access to said destination network.

51. The non-transitory readable medium according to claim 50, the software code further configured to cause the device to perform the following when executed by a processor of the device: enable an application to request access to said destination network, and inform said application about the connection to said destination network and wherein the destination network is the Internet and the wireless access network is a WLAN which is configured to provide access to the Internet and wherein, prior to generation of the at least one predetermined request, said wireless access network is unknown to said device.

52. The non-transitory readable medium according to claim 50, the software code further configured to cause the device to perform the following when executed by a processor of the device: use the at least one predetermined request to determine if a user interaction has been completed and wherein the destination network is the Internet and the wireless access network is a WLAN.

53. The non-transitory readable medium according to claim 50, wherein said device is a mobile terminal.

54. The non-transitory readable medium according to claim 50, wherein:
- the wireless access network is a WLAN; and
- the destination network is the Internet; and
- wherein, prior to generation of the at least one predetermined request, said wireless access network is unknown to said device.

55. The non-transitory readable medium according to claim 50, wherein the at least one predetermined request is provided for transmission via a wireless local access network (WLAN) transceiver of the device, the WLAN transceiver enabling transmissions to and receptions from a WLAN and the device further comprising a wideband code division multiple access (WCDMA) transceiver enabling transmissions to and receptions from a WCDMA network and wherein the destination network is the Internet.

56. The non-transitory readable medium according to claim 50, wherein for the case a received response is another response than a predetermined response, the software code further configured to cause the device to at least present a logon page to the user;
- and wherein the at least one predetermined request is provided for transmission via a wireless local access network (WLAN) transceiver of the device, the WLAN transceiver enabling transmissions to and receptions from a WLAN, and the device further comprising a wideband code division multiple access (WCDMA) transceiver enabling transmissions to and receptions from a WCDMA network, and wherein the destination network is the Internet.

57. The non-transitory readable medium according to claim 50, wherein:
- the destination network is the Internet and wherein the wireless access network is a WLAN which is configured to provide access to the Internet after a browser authentication, and wherein, prior to generation of said at least one predetermined request, said wireless access network is unknown to said device,
and wherein the software code stored on the non-transitory readable medium is configured to further cause the device to perform the following when executed by the processor of said device:
if a received response to said at least one predetermined request is another response than said predetermined response, then at least present a logon page to the user; and
use the at least one predetermined request to determine when browser authentication has been completed.

58. The non-transitory readable medium according to claim 50, wherein said device is a mobile device.

59. The non-transitory readable medium according to claim 50, wherein said at least one predetermined request comprises at least two predetermined requests that are transmitted, said software code further configured to cause the device to retransmit a second one of said at least two predetermined requests in case another response than a predetermined response to a first one of said at least two predetermined requests indicates a possibly required user interaction of a user of said device with said wireless access network, a detection of a predetermined response to said retransmitted second one of said at least two predetermined requests being an indication of a successfully completed user interaction; and
wherein:
the wireless access network is a WLAN; and
the destination network is the Internet; and
wherein, prior to generation of the at least one predetermined request, said wireless access network is unknown to said device.

60. The non-transitory readable medium according to claim 50, wherein, prior to generation of the at least one predetermined request, said wireless access network is unknown to said device.

61. The non-transitory readable medium according to claim 50, wherein said software code is further configured to cause the device to save said connection for further use.

62. The non-transitory readable medium according to claim 50, wherein applications of said device accessing said destination network via another connection are configured to roam to said connection for accessing said destination network in response to reception of a predetermined response to said at least one predetermined request; and wherein:
the wireless access network is a WLAN; and
the destination network is the Internet; and
wherein, prior to generation of the at least one predetermined request, said wireless access network is unknown to said device.

63. The non-transitory readable medium according to claim 50, wherein:
the destination network is the Internet and wherein the wireless access network is a WLAN which is configured to provide access to the Internet after a browser authentication; and
wherein prior to generation of the at least one predetermined request, said wireless access network is unknown to said device; and
wherein the software code stored on the non-transitory readable medium is configured to further cause the device to perform the following when executed by the processor of said device:
if a received response to said at least one predetermined request is another response than said predetermined response, then at least present a logon page to a user; and
use the at least one predetermined request to determine when browser authentication has been completed.

64. The non-transitory readable medium according to claim 50, wherein the destination network is one of a public Internet, a private network, an enterprise intranet or an operator service network.

65. The non-transitory readable medium according to claim 50, wherein the wireless access network is one of a public wireless local access network, a private wireless local access network or a wideband code division multiple access network.

66. The non-transitory readable medium according to claim 50, the software code further configured to cause the device to: initiate a user interaction in the case of receipt of another response than a predetermined response to said at least one predetermined request and wherein said initiating a user interaction is responsive, at least in part, to said another response than a predetermined response indicating a required user interaction of a user of said device with said wireless access network.

67. The non-transitory readable medium according to claim 66, the software code further configured to cause the device to: record said user interactions in a script, if allowed by a user.

68. The apparatus according to claim 41, wherein initiating a user interaction comprises at least one of:
presenting said another response than a predetermined response to the user;
presenting a logon page to the user; or
requiring a user to accept a legal disclaimer;
and wherein:
the wireless access network is a WLAN; and
the destination network is the Internet; and
wherein, prior to generation of the at least one predetermined request, said wireless access network is unknown to said apparatus.

69. The non-transitory readable medium according to claim 66, wherein initiating a user interaction comprises:
presenting a logon page to the user;
and wherein:
the wireless access network is a WLAN; and
the destination network is the Internet; and
wherein, prior to generation of the at least one predetermined request, said wireless access network is unknown to said device; and
wherein the software code stored on the non-transitory readable medium is configured to further cause the device to perform the following when executed by the processor of said device:
use the at least one predetermined request to determine when browser authentication has been completed.

70. The non-transitory readable medium according to claim 50, said software code configured to further cause the device to perform the following when executed by a processor of said device:
use the at least one predetermined request to differentiate between partial blocking of access to said destination network and full blocking of access to said destination network and wherein the full blocking of access comprises blocking of all protocols of the device and wherein the partial blocking of access involves blocking less than all protocols of the device and wherein the destination network is the Internet and the wireless access network is a WLAN.

71. The non-transitory readable medium according to claim 50, said software code configured to further cause the device to perform the following when executed by the processor of said device:
   determine whether the at least part of the wireless access network is blocking certain device protocols but not others and wherein the destination network is the Internet and the wireless access network is a WLAN.

72. The non-transitory readable medium according to claim 50, said software code configured to further cause the device to perform the following when executed by the processor of said device:
   use the at least one predetermined request to determine whether a wireless access network firewall is blocking certain protocols but not others and wherein the destination network is the Internet and the wireless access network is a WLAN.

73. The non-transitory readable medium according to claim 50, said software code configured to further cause the device to perform the following when executed by a processor of said device:
   use the at least one predetermined request to determine if browser authentication has been completed and wherein the destination network is the Internet and the wireless access network is a WLAN.

74. A non-transitory readable medium stored with software code, said software code configured to cause a connectivity test server of a destination network to perform the following when executed by a processor of said connectivity test server:
   receive at least one predetermined request from a device via a wireless access network, which at least one predetermined request has been transmitted by the device for testing whether the wireless access network enables at least some access to said destination network, the destination network being a first network and the wireless access network being a second network and the connectivity test server being configured for providing a test service for testing a successful access to the destination network, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request; and
   generate a predetermined response to said at least one received predetermined request, said predetermined response being known at the device, and providing said predetermined response for transmission to said device via said wireless access network, wherein reception of said predetermined response to said at least one predetermined request at said device is considered to indicate a connection to said destination network, and wherein a reception comprising at least another response than said predetermined response to said at least one predetermined request at said device is considered to indicate that at least part of the wireless access network is blocking at least part of the access to said destination network.

75. A method comprising:
   generating at least one predetermined request at a device with wireless transceiver for testing whether a wireless access network enables at least some access to a destination network, the at least one predetermined request addressed to a connectivity test server in the destination network and the connectivity test server configured for providing a test service for testing a successful access to the destination network;
   transmitting said at least one predetermined request to the wireless access network, the destination network being a first network and the wireless access network being a second network;
   determining whether a response to said at least one predetermined request is received from said wireless access network and whether a received response corresponds to a predetermined response which is known to be provided by said connectivity test server in case said connectivity test server is reached by said at least one predetermined request, wherein reception of said predetermined response to said at least one predetermined request is considered to indicate a connection to said destination network, and wherein a reception comprising at least another response than said predetermined response to said at least one predetermined request is considered to indicate that at least part of the wireless access network is blocking at least part of the access to said destination network; and
   initiating a user interaction in the case of receipt of said another response than a predetermined response to said at least one predetermined request, and wherein said initiating a user interaction is responsive, at least in part, to said another response than a predetermined response indicating a required user interaction of a user of said device with said wireless access network.

76. The method according to claim 75, wherein said device is a mobile terminal.

77. The method according to claim 75, wherein said at least one predetermined request comprises at least two predetermined requests, and wherein in case another response than a predetermined response to a first one of said at least two predetermined requests indicates a required user interaction of a user of said device with said wireless access network, said method further comprising transmitting a second one of said at least two predetermined requests, a detection of a predetermined response to said second one of said at least two predetermined requests being an indication of a successfully completed user interaction.

78. The method according to claim 75, wherein initiating a user interaction comprises:
   presenting a logon page to the user;
   and wherein:
   the wireless access network is a WLAN; and
   the destination network is the Internet; and
   wherein, prior to generation of the at least one predetermined request, said wireless access network is unknown to said device; and
   wherein the method further comprises:
   using the at least one predetermined request to determine when browser authentication has been completed.

79. The method according to claim 75, wherein, prior to generation of the at least one predetermined request, said wireless access network is unknown to said device.

80. The method according to claim 75, further comprising:
   if allowed by a user, saving said connection for further use.

81. The method according to claim 75, wherein applications of said device accessing said destination network via another connection roam to said connection for accessing said destination network in response to reception of a predetermined response to said at least one predetermined request;

and wherein:
the wireless access network is a WLAN; and
the destination network is the Internet; and
wherein, prior to generation of the at least one predetermined request, said wireless access network is unknown to said device.

82. The method according to claim 75, wherein the destination network is the Internet and the wireless access network is a WLAN which is configured to provide access to the Internet after a browser authentication;

and wherein:
prior to generation of the at least one predetermined request, said wireless access network is unknown to said device.

83. The method according to claim 75, wherein the destination network is one of a public Internet, a private network, an enterprise intranet or an operator service network.

84. The method according to claim 75, wherein the wireless access network is one of a public wireless local access network, a private wireless local access network or a wideband code division multiple access network.

85. The method according to claim 75, wherein said access to said destination network is requested by an application of said device, said method further comprising informing said application about said connection to said destination network; and wherein:
the wireless access network is a WLAN; and
the destination network is the Internet; and
wherein prior to generation of the at least one predetermined request, said wireless access network is unknown to said device.

86. The method according to claim 75, wherein:
the wireless access network is a WLAN; and
the destination network is the Internet.

87. The method according to claim 75, further comprising:
if allowed by a user, recording said user interaction in a script.

88. The method according to claim 75, wherein the at least one predetermined request is provided for transmission via a wireless local access network (WLAN) transceiver of the device, the WLAN transceiver enabling transmissions to and receptions from a WLAN and the device further comprising a wideband code division multiple access (WCDMA) transceiver enabling transmissions to and receptions from a WCDMA network.

89. The method according to claim 75, further comprising in the case a received response is another response than the predetermined response:
at least presenting a logon page to the user;
and wherein:
the wireless access network is a WLAN; and
the destination network is the Internet and
wherein, prior to generation of the at least one predetermined request, said wireless access network is unknown to said device.

90. The method according to claim 75, wherein:
the destination network is the Internet and the wireless access network is a WLAN which is configured to provide access to the Internet after a browser authentication.

91. The method according to claim 75, wherein said at least one predetermined request comprises at least one of a predetermined hypertext transfer protocol request, a predetermined user datagram protocol request, a predetermined transmission control protocol request or a predetermined simple traversal of user datagram protocol through network address translators request.

92. The method according to claim 75, wherein:
said at least one predetermined request comprises at least one of a predetermined hypertext transfer protocol request, a predetermined user datagram protocol request, a predetermined transmission control protocol request or a predetermined simple traversal of user datagram protocol through network address translators request; and
wherein the destination network is the Internet and said wireless access network is a WLAN; and
wherein, prior to generation of the at least one predetermined request, said wireless access network is unknown to said device.

93. The method according to claim 75, wherein said at least one predetermined request comprises at least one of a predetermined hypertext transfer protocol request, a predetermined user datagram protocol request, or a predetermined transmission control protocol request.

94. The method according to claim 75, wherein:
the wireless access network is a WLAN; and
the destination network is the Internet; and
wherein the device further comprises a wideband code division multiple access (WCDMA) transceiver enabling transmissions to and receptions from a WCDMA network; and
wherein, prior to generation of the at least one predetermined request, said wireless access network is unknown to said device.

95. An apparatus comprising a processor, memory, software code, and a wireless transceiver enabling the apparatus to transmit to and receive from a wireless access network,
the software code and the memory configured to, with the processor, cause the apparatus to generate at least one predetermined request for testing whether the wireless access network enables at least some access to a destination network, the at least one predetermined request addressed to a connectivity test server in the destination network, wherein the connectivity test server is configured for providing a test service for testing a successful access to the destination network;
the software code and the memory configured to, with the processor, cause the apparatus to provide said at least one predetermined request for transmission to the wireless access network, the destination network being a first network and the wireless access network being a second network;
the software code and the memory configured to, with the processor, cause the apparatus to determine whether a response to a transmitted at least one predetermined request is received from said wireless access network and whether a received response corresponds to a predetermined response which is known to be provided by said connectivity test server in case said connectivity test server is reached by said at least one predetermined request;
the software code and the memory configured to, with the processor, cause the apparatus to consider reception of said predetermined response to said at least one predetermined request to indicate a connection to said destination network, and to consider a reception comprising at least another response than said predetermined response to said at least one predetermined request to indicate that at least part of the wireless access network is blocking at least part of the access to said destination network; and the software code and the memory configured to, with the processor, cause the apparatus to initiate a user interaction in the case of receipt of said another response than a predetermined response to said at least one predetermined request, wherein said initiating a user interaction is responsive, at least in part, to said another response than a predetermined response indicating a required user interaction of a user of said apparatus with said wireless access network.

96. The apparatus according to claim 95, wherein said apparatus is a mobile apparatus.

97. The apparatus according to claim 95, wherein said at least one predetermined request comprises at least two predetermined requests, said software code and said memory being configured to, with the processor, cause the apparatus to transmit a second one of said at least two predetermined requests in case another response than a predetermined response to a first one of said at least two predetermined requests indicates a required user interaction of a user of said apparatus with said wireless access network, a detection of a predetermined response to said second one of said at least two predetermined requests being an indication of a successfully completed user interaction, wherein:
the wireless access network is a WLAN; and
the destination network is the Internet; and
wherein, prior to generation of the at least one predetermined request, said wireless access network is unknown to said apparatus.

98. The apparatus according to claim 95, wherein initiating a user interaction comprises:
presenting a logon page to the user;
and wherein:
the wireless access network is a WLAN; and
the destination network is the Internet; and
wherein, prior to generation of the at least one predetermined request, said wireless access network is unknown to said apparatus;
and wherein the software code and the memory configured to, with the processor, cause the apparatus to use the at least one predetermined request to determine when browser authentication has been completed.

99. The apparatus according to claim 95, wherein, prior to generation of the at least one predetermined request, said wireless access network is unknown to said apparatus.

100. The apparatus according to claim 95, wherein said software code and said memory are further configured to, with the processor, cause the apparatus to save said connection for further use.

101. The apparatus according to claim 95, wherein applications of said apparatus accessing said destination network via another connection are configured to roam to said connection for accessing said destination network in response to reception of a predetermined response to said at least one predetermined request;
and wherein:
the wireless access network is a WLAN; and
the destination network is the Internet; and
wherein, prior to generation of the at least one predetermined request, said wireless access network is unknown to said apparatus.

102. The apparatus according to claim 95, wherein:
the wireless access network is configured to provide access to the destination network after a browser authentication;

and wherein:
the wireless access network is a WLAN; and
the destination network is the Internet; and
wherein, prior to generation of the at least one predetermined request, said wireless access network is unknown to said apparatus; and
wherein the software code and the memory configured to, with the processor, cause the apparatus to use the at least one predetermined request to determine when browser authentication has been completed.

103. The apparatus according to claim 95, wherein the destination network is one of a public Internet, a private network, an enterprise intranet or an operator service network.

104. The apparatus according to claim 95, wherein the wireless access network is one of a public wireless local access network, a private wireless local access network or a wideband code division multiple access network.

105. The apparatus according to claim 95, said software code and the memory being configured to, with the processor, cause the apparatus to enable an application to request access to said destination network, and said software code and the memory being configured to, with the processor, cause the apparatus to inform said application about said connection to said destination network; and
wherein:
the wireless access network is a WLAN; and
the destination network is the Internet and
wherein, prior to generation of the at least one predetermined request, said wireless access network is unknown to said apparatus.

106. The apparatus according to claim 95, said software code and the memory being configured to, with the processor, cause the apparatus to save said connection for further use; and
wherein:
the wireless access network is a WLAN; and
the destination network is the Internet; and
wherein, prior to generation of the at least one predetermined request, said wireless access network is unknown to said apparatus.

107. The apparatus according to claim 95, wherein said wireless transceiver comprises a wideband code division multiple access (WCDMA) transceiver enabling transmissions to and receptions from a WCDMA network, wherein:
the wireless access network is a WLAN; and
the destination network is the Internet; and
wherein, prior to generation of the at least one predetermined request, said wireless access network is unknown to said apparatus.

108. The apparatus according to claim 95, wherein:
the wireless access network is a WLAN; and
the destination network is the Internet.

109. The apparatus according to claim 95, wherein said software code and the memory are configured to, with the processor, cause the apparatus to use the at least one predetermined request to determine if the user interaction has been completed and wherein the destination network is the Internet and the wireless access network is a WLAN.

110. The apparatus according to claim 95, wherein the at least one predetermined request is provided for transmission via a wireless local access network (WLAN) transceiver of the apparatus, the WLAN transceiver enabling transmissions to and receptions from a WLAN, and the apparatus further comprising a wideband code division multiple access (WCDMA) transceiver enabling transmissions to and receptions from a WCDMA network; and wherein:

the destination network is the Internet; and wherein, prior to generation of the at least one predetermined request, said wireless access network is unknown to said apparatus; and wherein the software code and the memory configured to, with the processor, cause the apparatus to use the at least one predetermined request to determine when browser authentication is needed and to use the at least one predetermined request to determine when browser authentication has been completed;

the software code and the memory configured to, with the processor, cause the apparatus to allow saving at least some connection information for future use; and the software code and the memory configured to, with the processor, cause the apparatus to, after the apparatus determines that the browser authentication has been completed, inform at least one application of the apparatus about the connection to said destination network; and wherein the at least one predetermined request comprises more than one transmitted request.

111. The apparatus according to claim 95, wherein for the case a received response is another response than the predetermined response, said software code and the memory are configured to, with the processor, cause the apparatus to:
present a logon page to the user; and
wherein:
the wireless access network is a WLAN; and
the destination network is the Internet; and
wherein, prior to generation of the at least one predetermined request, said wireless access network is unknown to said apparatus.

112. The apparatus according to claim 95, wherein:
the destination network is the Internet and the wireless access network is a WLAN which is configured to provide access to the Internet after a browser authentication; and
wherein, prior to generation of the at least one predetermined request, said wireless access network is unknown to said apparatus.

113. The apparatus according to claim 95, wherein said at least one predetermined request comprises at least one of a predetermined hypertext transfer protocol request, a predetermined user datagram protocol request, a predetermined transmission control protocol request or a predetermined simple traversal of user datagram protocol through network address translators request.

114. The apparatus according to claim 95, wherein the software code and the memory are further configured to, with the processor, cause the apparatus through use of the at least one predetermined request to differentiate between partial blocking of access to said destination network and full blocking of access to said destination network and wherein the full blocking of access comprises blocking of all protocols of the apparatus and wherein the partial blocking of access involves blocking less than all protocols of the apparatus and wherein the destination network is the Internet and the wireless access network is a WLAN and wherein, prior to generation of the at least one predetermined request, said wireless access network is unknown to said apparatus.

115. The apparatus according to claim 95, wherein the software code and the memory are further configured to, with the processor, cause the apparatus to determine whether the at least part of the wireless access network is blocking certain protocols of the apparatus but not others; and
wherein the destination network is the Internet and the wireless access network is a WLAN; and wherein, prior to generation of the at least one predetermined request, said wireless access network is unknown to said apparatus; and wherein the software code and memory are further configured to, with the processor, cause the apparatus to use the at least one predetermined request to determine when browser authentication is needed and to use the at least one predetermined request to determine when browser authentication has been completed;

the software code and memory are further configured to, with the processor, cause the apparatus to, after the apparatus determines that the browser authentication has been completed, inform at least one application of the apparatus about the connection to said destination network; and wherein the at least one predetermined request comprises more than one transmitted request.

116. The apparatus according to claim 95, wherein the software code and the memory are further configured to, with the processor, cause the apparatus through use of the at least one predetermined request to determine whether a wireless access network firewall is blocking certain protocols but not others and wherein the destination network is the Internet and the wireless access network is a WLAN and wherein, prior to generation of the at least one predetermined request, said wireless access network is unknown to said apparatus.

117. The apparatus according to claim 95, wherein the software code and the memory are further configured to, with the processor, cause the apparatus through use of the at least one predetermined request to determine if browser authentication has been completed and wherein the destination network is the Internet and the wireless access network is a WLAN and wherein, prior to generation of the at least one predetermined request, said wireless access network is unknown to said apparatus.

118. The apparatus according to claim 95, wherein said at least one predetermined request comprises at least one of a predetermined hypertext transfer protocol request, a predetermined user datagram protocol request, a predetermined transmission control protocol request, or a predetermined simple traversal of user datagram protocol through network address translators request and wherein the destination network is the Internet.

119. The apparatus according to claim 95, wherein said at least one predetermined request comprises at least one of a predetermined hypertext transfer protocol request, a predetermined user datagram protocol request, or a predetermined transmission control protocol request and wherein the destination network is the Internet and the wireless access network is a WLAN and wherein, prior to generation of the at least one predetermined request, said wireless access network is unknown to said apparatus.

120. The apparatus according to claim 95, wherein:
the wireless access network is a WLAN; and
the destination network is the Internet; and
wherein the device further comprises a wideband code division multiple access (WCDMA) transceiver enabling transmissions to and receptions from a WCDMA network; and
wherein, prior to generation of the at least one predetermined request, said wireless access network is unknown to said apparatus.

121. A non-transitory readable medium stored with software code, said software code configured to cause a device with wireless transceiver to perform the following when executed by a processor of said device:

generate at least one predetermined request for testing whether a wireless access network enables at least some access to a destination network, the at least one predetermined request addressed to a connectivity test server in the destination network and the connectivity test server being configured for providing a test service for testing a successful access to the destination network;

provide said at least one predetermined request for transmission to the wireless access network, the destination network being a first network and the wireless access network being a second network;

determine whether a response to said at least one predetermined request is received from said wireless access network and whether a received response corresponds to a predetermined response which is known to be provided by said connectivity test server in case said connectivity test server is reached by said at least one predetermined request, wherein reception of said predetermined response to said at least one predetermined request is considered to indicate a connection to said destination network, and wherein a reception comprising at least another response than said predetermined response to said at least one predetermined request is considered to indicate that at least part of the wireless access network is blocking at least part of the access to said destination network; and initiate a user interaction in the case of receipt of said another response than a predetermined response to said at least one predetermined request, and wherein said initiating a user interaction is responsive, at least in part, to said another response than a predetermined response indicating a required user interaction of a user of said device with said wireless access network.

122. The non-transitory readable medium according to claim 121, wherein said device is a mobile device.

123. The non-transitory readable medium according to claim 121, wherein said at least one predetermined request comprises at least two predetermined requests, said software code further configured to cause the device to transmit a second one of said at least two predetermined requests in case another response than a predetermined response to a first one of said at least two predetermined requests indicates a required user interaction of a user of said device with said wireless access network, a detection of a predetermined response to said second one of said at least two predetermined requests being an indication of a successfully completed user interaction; and
wherein:
the wireless access network is a WLAN; and
the destination network is the Internet; and
wherein, prior to generation of the at least one predetermined request, said wireless access network is unknown to said device.

124. The non-transitory readable medium according to claim 121, wherein initiating a user interaction comprises:
presenting a logon page to the user; and wherein:
the wireless access network is a WLAN; and
the destination network is the Internet; and
prior to generation of the at least one predetermined request, said wireless access network is unknown to said device; and
wherein the software code is further configured to, with the processor, cause the device to use the at least one predetermined request to determine when browser authentication has been completed.

125. The non-transitory readable medium according to claim 121, wherein, prior to generation of the at least one predetermined request, said wireless access network is unknown to said device.

126. The non-transitory readable medium according to claim 121, wherein said software code is further configured to cause the device to save said connection for further use and wherein:
the wireless access network is a WLAN; and
the destination network is the Internet; and
prior to generation of the at least one predetermined request, said wireless access network is unknown to said device.

127. The non-transitory readable medium according to claim 121, wherein applications of said device accessing said destination network via another connection are configured to roam to said connection for accessing said destination network in response to reception of a predetermined response to said at least one predetermined request; and wherein:
the wireless access network is a WLAN; and
the destination network is the Internet; and
prior to generation of the at least one predetermined request, said wireless access network is unknown to said device.

128. The non-transitory readable medium according to claim 121, wherein:
the wireless access network is a WLAN and is configured to provide access to the destination network after a browser authentication and wherein the destination network is the Internet; and wherein:
prior to generation of the at least one predetermined request, said wireless access network is unknown to said device.

129. The non-transitory readable medium according to claim 121, wherein the destination network is one of a public Internet, a private network, an enterprise intranet or an operator service network.

130. The non-transitory readable medium according to claim 121, wherein the wireless access network is one of a public wireless local access network, a private wireless local access network or a wideband code division multiple access network.

131. The non-transitory readable medium according to claim 121, the software code further configured to cause the device to perform the following when executed by a processor of the device: enable an application to request access to said destination network, and inform said application about a connection to said destination network; and wherein:
the wireless access network is a WLAN; and
the destination network is the Internet; and
prior to generation of the at least one predetermined request, said wireless access network is unknown to said device.

132. The non-transitory readable medium according to claim 121, the software code further configured to cause the device to perform the following when executed by a processor of the device: save a connection for further use; and wherein:
the wireless access network is a WLAN; and
the destination network is the Internet; and
prior to generation of the at least one predetermined request, said wireless access network is unknown to said device.

133. The non-transitory readable medium according to claim 121, wherein said device is a mobile terminal.

134. The non-transitory readable medium according to claim 121, wherein:
the wireless access network is a WLAN; and
the destination network is the Internet.

135. The non-transitory readable medium according to claim 121, the software code further configured to cause the device to: record said user interactions in a script, if allowed by a user; and wherein:
the wireless access network is a WLAN; and
the destination network is the Internet; and
prior to generation of the at least one predetermined request, said wireless access network is unknown to said device.

136. The non-transitory readable medium according to claim 121, wherein the at least one predetermined request is provided for transmission via a wireless local access network (WLAN) transceiver of the device, the WLAN transceiver enabling transmissions to and receptions from a WLAN and the device further comprising a wideband code division multiple access (WCDMA) transceiver enabling transmissions to and receptions from a WCDMA network;
and wherein the destination network is the Internet;
the software code further configured to, with the processor, cause the apparatus to use the at least one predetermined request to determine when browser authentication is needed and to use the at least one predetermined request to determine when browser authentication has been completed;
the software code further configured to, with the processor, cause the apparatus to allow saving at least some connection information for future use; and
the software code further configured to, with the processor, cause the apparatus to, after the apparatus determines that the browser authentication has been completed, inform at least one application of the apparatus about the connection to said destination network; and
wherein the at least one predetermined request comprises more than one transmitted request.

137. The non-transitory readable medium according to claim 121, wherein for the case a received response comprises at least another response than a predetermined response, the software code further configured to cause the device to:
present a logon page to the user;
and wherein:
the wireless access network is a WLAN; and
the destination network is the Internet; and
prior to generation of the at least one predetermined request, said wireless access network is unknown to said device;
the software code further configured to, with the processor, cause the apparatus to use the at least one predetermined request to determine when browser authentication is needed and to use the at least one predetermined request to determine when browser authentication has been completed;
the software code further configured to, with the processor, cause the apparatus to, after the apparatus determines that the browser authentication has been completed, inform at least one application of the apparatus about the connection to said destination network; and
wherein the at least one predetermined request comprises more than one transmitted request.

138. The non-transitory readable medium according to claim 121, wherein:
the destination network is the Internet and wherein the wireless access network is a wireless local access network which is configured to provide access to the Internet after a browser authentication.

139. The non-transitory readable medium according to claim 121, wherein said at least one predetermined request comprises at least one of a predetermined hypertext transfer protocol request, a predetermined user datagram protocol request, a predetermined transmission control protocol request or a predetermined simple traversal of user datagram protocol through network address translators request.

140. The non-transitory readable medium according to claim 121, said software code configured to further cause the device to perform the following when executed by a processor of said device:
use the at least one predetermined request to differentiate between partial blocking of access to said destination network and full blocking of access to said destination network and wherein the full blocking of access comprises blocking of all protocols of the device and wherein the partial blocking of access involves blocking less than all protocols of the device and wherein the destination network is the Internet and the wireless access network is a WLAN; and wherein, prior to generation of the at least one predetermined request, said wireless access network is unknown to said device.

141. The non-transitory readable medium according to claim 121, said software code configured to further cause the device to perform the following when executed by the processor of said device:
use the at least one predetermined request to determine whether the at least part of the wireless access network is blocking certain protocols of the device but not others,
and use the at least one predetermined request to determine when browser authentication is needed and use the at least one predetermined request to determine when browser authentication has been completed;
after the apparatus determines that the browser authentication has been completed, inform at least one application of the apparatus about the connection to said destination network;
and wherein the at least one predetermined request comprises more than one transmitted request;
and wherein the destination network is the Internet and the wireless access network is a WLAN;
and wherein, prior to generation of the at least one predetermined request, said wireless access network is unknown to said device.

142. The non-transitory readable medium according to claim 121, said software code configured to further cause the device to perform the following when executed by a processor of said device:
use the at least one predetermined request to determine whether a wireless access network firewall is blocking certain protocols but not others; and wherein the destination network is the Internet and the wireless access network is a WLAN; and wherein, prior to generation of the at least one predetermined request, said wireless access network is unknown to said device and
use the at least one predetermined request to determine when browser authentication is needed and use the at least one predetermined request to determine when browser authentication has been completed;
and wherein the at least one predetermined request comprises more than one transmitted request.

143. The non-transitory readable medium according to claim 121, said software code configured to further cause the device to perform the following when executed by a processor of said device:

use the at least one predetermined request to determine if the user interaction has been completed and wherein the destination network is the Internet and the wireless access network is a WLAN; and wherein, prior to generation of the at least one predetermined request, said wireless access network is unknown to said device.

144. The non-transitory readable medium according to claim 121, wherein said at least one predetermined request comprises at least one of a predetermined hypertext transfer protocol request, a predetermined user datagram protocol request, a predetermined transmission control protocol request or a predetermined simple traversal of user datagram protocol through network address translators request;

and wherein the destination network is the Internet;

and the wireless access network is a WLAN;

and wherein, prior to generation of the at least one predetermined request, said wireless access network is unknown to said device.

145. The non-transitory readable medium according to claim 121, wherein said at least one predetermined request comprises at least one of a predetermined hypertext transfer protocol request, a predetermined user datagram protocol request, or a predetermined transmission control protocol request.

146. The non-transitory readable medium according to claim 121, wherein:

the wireless access network is a WLAN; and the destination network is the Internet; and wherein the device further comprises a wideband code division multiple access (WCDMA) transceiver enabling transmissions to and receptions from a WCDMA network;

and wherein, prior to generation of the at least one predetermined request, said wireless access network is unknown to said device.

\* \* \* \* \*

UNITED STATES PATENT AND TRADEMARK OFFICE
CERTIFICATE OF CORRECTION

PATENT NO. : 9,516,678 B2  
APPLICATION NO. : 13/352649  
DATED : December 6, 2016  
INVENTOR(S) : Henry Haverinen et al.

Page 1 of 1

It is certified that error appears in the above-identified patent and that said Letters Patent is hereby corrected as shown below:

In Column 13
Line 33, "network 310 to the "CoffeSpot" should read, --network 310 to the "Coffee Spot"--;

In Column 15
In Claim 1, Lines 2-3, "request at a mobile device" should read, --request at a device--.

Signed and Sealed this
Twenty-eighth Day of February, 2017

Michelle K. Lee
*Director of the United States Patent and Trademark Office*